United States Patent
Saito

(10) Patent No.: US 11,172,078 B2
(45) Date of Patent: Nov. 9, 2021

(54) SERVER, NON-TRANSITORY COMPUTER-READABLE RECORDING MEDIUM STORING COMPUTER READABLE INSTRUCTIONS FOR THE SERVER, COMMUNICATION DEVICE, AND COMMUNICATION SYSTEM

(71) Applicant: BROTHER KOGYO KABUSHIKI KAISHA, Nagoya (JP)

(72) Inventor: Ken Saito, Tokoname (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/911,619

(22) Filed: Jun. 25, 2020

(65) Prior Publication Data
US 2020/0412886 A1    Dec. 31, 2020

(30) Foreign Application Priority Data

Jun. 27, 2019 (JP) ............................. JP2019-120345
Apr. 24, 2020 (JP) ............................... 2020-077711

(51) Int. Cl.
*H04N 1/00* (2006.01)
*H04L 29/12* (2006.01)
*H04L 12/58* (2006.01)

(52) U.S. Cl.
CPC ......... *H04N 1/00212* (2013.01); *H04L 51/08* (2013.01); *H04L 61/307* (2013.01); *H04N 1/0048* (2013.01)

(58) Field of Classification Search
CPC .............. H04N 1/00212; H04N 1/0048; H04L 61/307; H04L 51/08
(Continued)

(56) References Cited

U.S. PATENT DOCUMENTS 6,823,367 B1    11/2004 Wakasugi et al.
8,792,118 B2 *   7/2014 Vendrow ............ H04N 1/00214
                                             358/1.15

(Continued)

FOREIGN PATENT DOCUMENTS

JP     H10-308766 A    11/1998
JP     2001-265675 A    9/2001
(Continued)

*Primary Examiner* — Neil R McLean
(74) *Attorney, Agent, or Firm* — Scully, Scott, Murphy & Presser, PC

(57) ABSTRACT

A server may store first device identification information identifying a first device. The server may, in a case where alert information is received, store restriction information in the memory in association with the first device identification information; receive second sending information from the first device; and in a case where the second sending information is received from the first device in a state where the restriction information is not stored in association with the first device identification information, send a second email with a first email address as a destination stored in association with the first device identification information, wherein in a case where the second sending information is received from the first device in a state where the restriction information is stored in association with the first device identification information, the sending of the second email is restricted.

18 Claims, 15 Drawing Sheets

(58) Field of Classification Search
USPC .......................................................... 358/402
See application file for complete search history.

(56) References Cited

U.S. PATENT DOCUMENTS

2002/0194553 A1    12/2002  Okamoto et al.
2016/0227051 A1*    8/2016  Hanada .............. H04N 1/00217
2019/0281189 A1*    9/2019  Watts .................. H04M 7/0024

FOREIGN PATENT DOCUMENTS

| | | |
|---|---|---|
| JP | 2002-297506 A | 10/2002 |
| JP | 2003-281060 A | 10/2003 |
| JP | 2009-100200 A | 5/2009 |

* cited by examiner

FIG. 10

(Continuation of FIG.9)

Server —10

Ⓐ

(T50) Create Email ID "m01" and URL ID "u01"

(T52) Send Email EM1

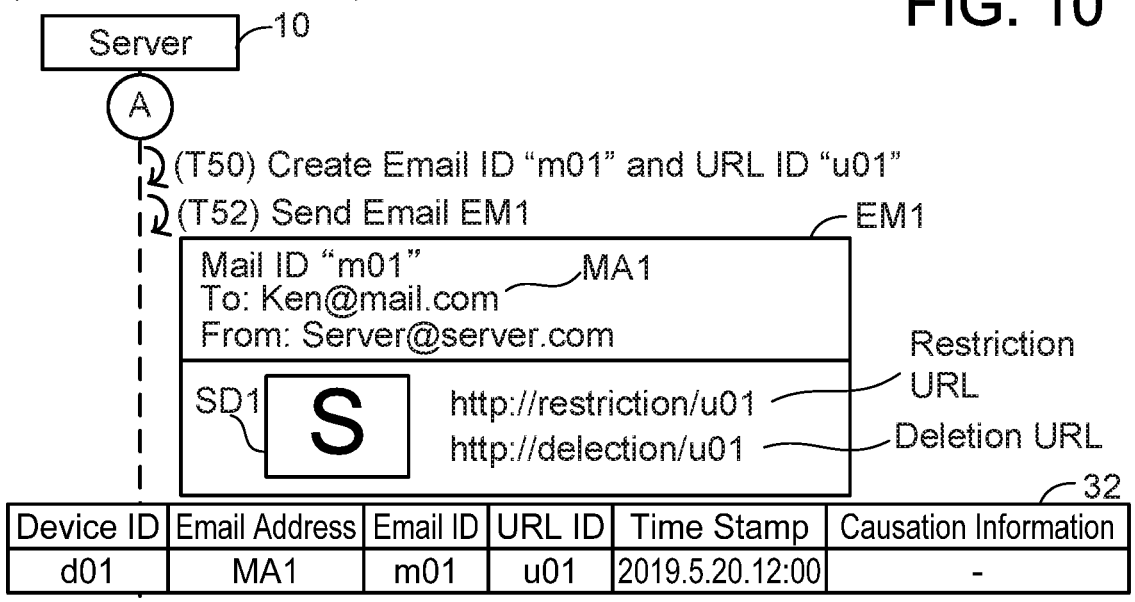

| Device ID | Email Address | Email ID | URL ID | Time Stamp | Causation Information |
|---|---|---|---|---|---|
| d01 | MA1 | m01 | u01 | 2019.5.20.12:00 | - |

(Case A1: Temporary Disconnection or Inexistent Address)

(T54) Receive Unsent Notification (Email ID "m01", Error Code EC1 (or EC2))

(T56) Store Causation Information "Temporary Disconnection (or Inexistent Address)"

| Device ID | Email Address | Email ID | URL ID | Time Stamp | Causation Information |
|---|---|---|---|---|---|
| d01 | MA1 | m01 | u01 | 2019.5.20.12:00 | Temporary Disconnection |

(T58) Restriction Flag "OFF" → "ON"

| Device ID | Email Address | Restriction Flag |
|---|---|---|
| d01 | MA1 | ON |

(Case A2: Blocked)

(T74) Receive Blocked Notification (Email ID "m01")

(T76) Store Causation Information "Blocked"

(T78) Restriction Flag "OFF" → "ON"

Terminal Device —500

(Case A3 : Restriction URL)

(T84) Restriction Request (URL ID "u01") ← (T80) Click on Restriction URL (T86) Store Causation Information "Restriction Request"

(T88) Restriction Flag "OFF" → "ON"

(T94) Deletion Request (URL ID "u01") ← (T90) Click on Deletion URL (T96) Delete Causation Information "Restriction Request"

(T98) Restriction Flag "ON" → "OFF"

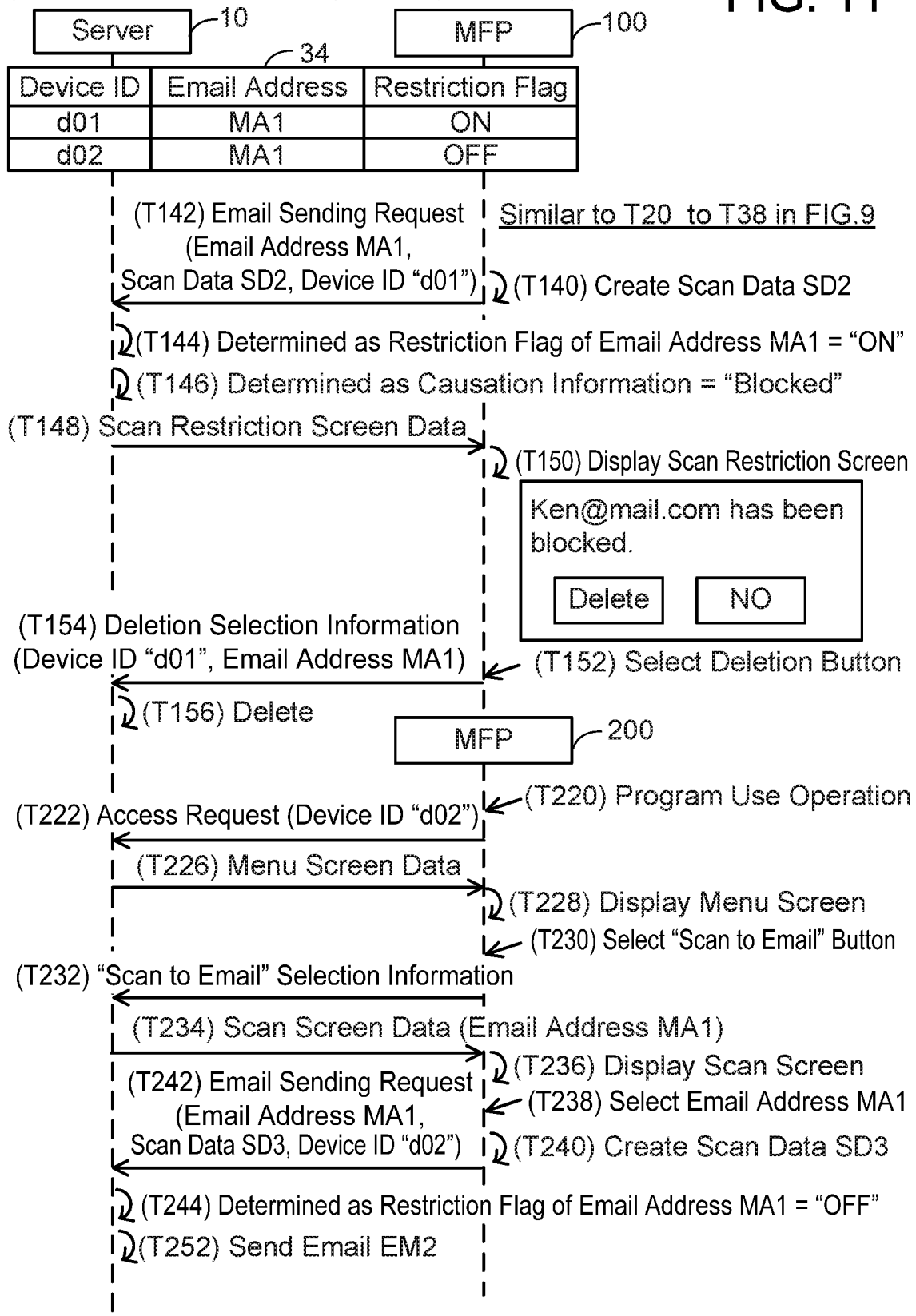

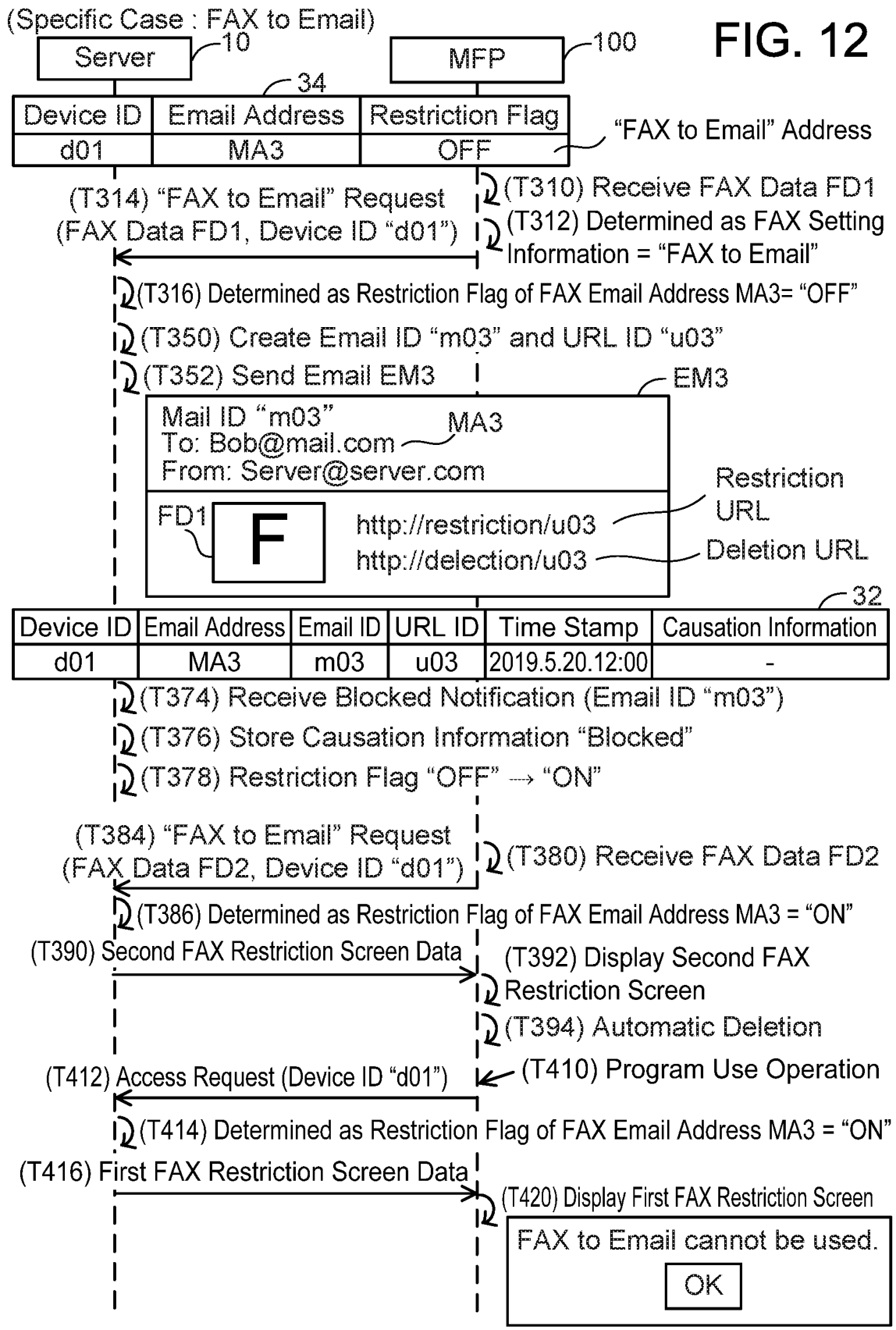

SERVER, NON-TRANSITORY COMPUTER-READABLE RECORDING MEDIUM STORING COMPUTER READABLE INSTRUCTIONS FOR THE SERVER, COMMUNICATION DEVICE, AND COMMUNICATION SYSTEM

CROSS-REFERENCE TO RELATED APPLICATION

This application claims priority to Japanese Patent Application No. 2019-120345 filed on Jun. 27, 2019 and Japanese Patent Application No. 2020-77711 filed on Apr. 24, 2020, the contents of which are hereby incorporated by reference into the present application.

TECHNICAL FIELD

The present disclosure relates to the art related to a device comprising a function of sending an email.

BACKGROUND

A multi-function peripheral which sends an email with attached image data is known. The multi-function peripheral sends the email with the attached image data created by its scan executing unit to a designated recipient in a case where such a specific recipient is designated by a user from among a plurality of recipients stored in the multi-function peripheral. Here, the email includes a unique message ID. In a case where an error email including such message ID is received after having sent the email, the multi-function peripheral uses this message ID to specify which email recipient address the error has occurred with. The multi-function peripheral registers error information in association with the specified recipient address. Thereafter, the multi-function peripheral executes display based on the error information when that specified recipient address is designated as a recipient address for a new email by the user.

SUMMARY

In the aforementioned technique, the multi-function peripheral needs to have a function of sending an email. For example, a configuration may be assumed in which a server that is communicable with the multi-function peripheral sends an email on behalf of the multi-function peripheral. The above technique has not given any consideration to such a configuration.

The present disclosure provides an art configured to suitably execute processes according to an alert related to an email in a configuration in which a server sends an email.

A server disclosed herein may comprise: a processor; a memory storing a first email address in association with first device identification information identifying a first device and storing computer-readable instructions therein, wherein the computer-readable instructions, when executed by the processor, cause the server to: receive first sending information from the first device, the first sending information being for sending a first email, and the first email being related to sending of first image data; in a case where the first sending information is received from the first device, send the first email with the first email address as destination stored in association with the first device identification information identifying the first device; in the case where the first sending information is received from the first device, store email identification information identifying the first email in the memory in association with the first device identification information identifying the first device; in a case where alert information including the email identification information is received after the first email has been sent, store restriction information in the memory in association with the first device identification information associated with the email identification information, the restriction information indicating restriction on sending of an email; receive second sending information from the first device, the second sending information being for sending a second email, and the second email being related to sending of second image data; and in a case where the second sending information is received from the first device in a state where the restriction information is not stored in association with the first device identification information, send the second email with the first email address as destination stored in association with the first device identification information identifying the first device, wherein in a case where the second sending information is received from the first device in a state where the restriction information is stored in association with the first device identification information, the sending of the second email is restricted.

A communication device further disclosed herein may comprise: a processor; a second memory storing computer-readable instructions therein, wherein the computer-readable instructions, when executed by the processor, cause the communication device to: in a case where a first instruction for sending a first email is accepted in the communication device, send a first email sending request to a server, the first email sending request being for requesting a sending of the first email which is related to sending of first image data; in a case where the server receives alert information including email identification information identifying the first email after the server has sent the first email in accordance with the first email sending request, receive a storing request from the server, the storing request being for requesting to store restriction information in a third memory in association with an email address indicating a destination of the first email, the restriction information indicating restriction on sending of an email; and in a case where a second instruction for sending a second email with the email address in the third memory as destination is accepted in the communication device in a state where the restriction information is not stored in the third memory, send a second email sending request to the server, the second email sending request being for requesting a sending of the second email which is related to sending of second image data, wherein in a case where the second instruction is accepted in the communication device in a state where the restriction information is stored in the third memory in association with the email address, the sending of the second email, sending request to the server is restricted.

A control method and a computer program for realizing the aforementioned server, as well as a computer-readable recording medium storing the computer program are also novel and useful. Further, a communication system provided with the aforementioned server and another device (such as a first device) is also novel and useful.

BRIEF DESCRIPTION OF DRAWINGS

FIG. 10 shows a continuation of FIG. 9.
FIG. 11 shows a continuation of Case A2 of FIG. 10.
FIG. 12 shows a specific case in FAX to Email.

DETAILED DESCRIPTION

Embodiments

First Embodiment

Figure 1:
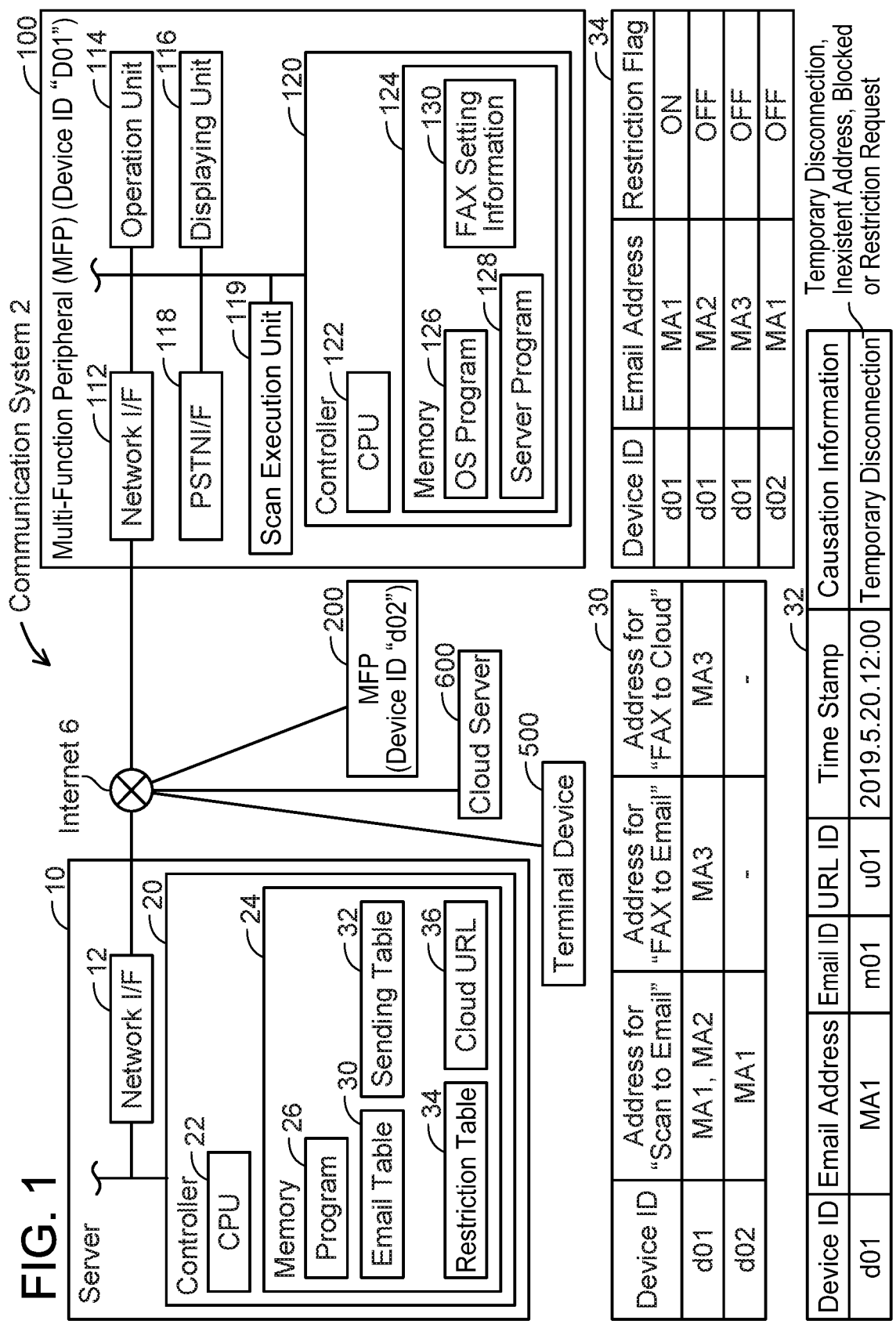
FIG. 1 shows a configuration of a communication system.

Configuration of Communication System 2; FIG. 1

As shown in FIG. 1, a communication system 2 comprises a server 10, two multi-function peripherals 100, 200, a terminal device 500, and a Cloud server 600. Each of the devices 10, 100, 200, 500, and 600 is connected to the Internet 6. The server 10 is configured to communicate with each of the devices 100, 200, 500, and 600 through the Internet 6. Hereinafter, each multi-function peripheral will be termed a "MFP (abbreviation for multi-function peripheral)". The terminal device 500 is a terminal such as a desktop PC, a tablet PC, or a smartphone. The Cloud server 600 is a server configured to provide a service of storing image data that is received from another device (such as MFP 100). The Cloud server 600 is, for example, a known third-party server such as "Evernote (registered trademark)", "Dropbox (registered trademark)", "Google (registered trademark) Drive", "Facebook (registered trademark)".

Configuration of Server 10

The server 10 is a server configured to send an email in accordance with an instruction from the MFP 100. The server 10 is installed on the Internet 6 by a vendor of each MFP 100 for example. Alternatively, in a variant, the server 10 may be installed on the Internet 6 by an entity different from the vendor.

The server 10 comprises a network interface 12 and a controller 20. Each of the units 12, 20 is connected to a bus line (not given a reference sign). Hereafter, an interface will be described as "I/F". The network I/F 12 is an interface configured to execute communication through the Internet 6, and is connected to the Internet 6. The controller 20 comprises a CPU 22 and a memory 24. The CPU 22 executes various processes in accordance with a program 26 stored in the memory 24. The memory 24 is constituted of a volatile memory, a non-volatile memory, and/or the like. The memory 24 stores an email table 30, a sending table 32, a restriction table 34, and a Cloud uniform resource locator (URL) 36 in addition to the program 26. The cloud URL 36 is a URL indicating a location of the Cloud server 600. Alternatively in a variant, each of the tables 30, etc. may be stored in an external memory communicably connected to the server 10. In the present variant, a system including the server 10 and the external memory is an example of a "server".

The email table 30 is a table configured to manage email addresses. The email table 30 stores, for each of the plural MFPs, a device ID (abbreviation of identifier) identifying the MFP, an address for "Scan to Email" (hereafter "Scan to Email" address), an address for "Fax to Email" (hereafter "Fax to Email" address), and an address for "Fax to Cloud" (hereafter "Fax to Cloud" address) in association with each other. The "Scan to Email" address is an address indicating a destination of an email related to a "Scan to Email" function. The "Fax to Email" address is an address indicating a destination of an email related to a "Fax to Email" function. The "Fax to Cloud" address is an address indicating a destination of an email related to a "Fax to Cloud" function. Hereafter, the "Scan to Email" function, the "Fax to Email" function, and the "Fax to Cloud" function will be collectively termed an "email function". The email function will be described below with reference to FIG. 2.

The sending table 32 is a table configured to manage information related to entails which the server 10 has sent (hereafter, "server emails"). The sending table 32 stores, for each of the plural server entails, the device ID identifying the MFP which instructed the sending of the server email, an email address indicating a destination of the server email, an email ID identifying the server email, a URL ID identifying URLs included in a body of the server email, a timestamp indicating date and time at which the server email was sent, and causation information related to the server email in association with each other. The aforementioned URLs comprise a restriction un and a deletion URL. The restriction URL is a URL that is clicked by a user in a case where the user rejects reception of the server email. The deletion URL is a URL that is clicked by the user in a case where the user allows the reception of the server email after the user has rejected the reception of the server email.

The causation information is information indicating causation of an alert with regard to the server email. The causation information indicates one of plural causations including "Temporary Disconnection", "Inexistent Address", "Blocked", and "Restriction Request". Here, the "Temporary Disconnection" indicates a temporary error that the server email cannot be sent to its destination. The temporary error takes place, for example, when an email server that corresponds to a domain name of the email address indicating the destination of the server email is temporarily disconnected from the Internet 6. The "Inexistent Address" indicates an error that the server email cannot be sent to its destination due to an email address indicating the server email destination not existing. The "Blocked" indicates that although the server email can be sent to the destination, the server email is blocked by that destination (such as an email server or a mailer). For example, if the server email is determined as a junk email, that server email is blocked. Once the server email has been blocked, the server email can no longer be sent to that destination. The "Restriction Request" indicates that the restriction URL, which will be described below, was clicked by the user, and the reception of the server email, has been rejected.

The restriction table 34 is a table configured to manage a restriction flag. The restriction flag indicates one of values including "ON" indicating a restriction on sending an email and "OFF" indicating un-restriction of sending the email. The restriction table 34 stores, for each of plural restriction flags, the device ID, the email address, and the restriction flag in association with each other.

Configurations of MFPs 100, 200

The MFP 100 is a peripheral device (i.e. a peripheral of the terminal device 500) configured to execute multiple functions including a print function, a scan function, and a facsimile (FAX) function. The MFP 100 comprises a network I/F 112, an operation unit 114, a display unit 116, a Public Switched Telephone Network (PSTN) I/F 118, a scan executing unit 119, and a controller 120. Each of the units 112 to 120 is connected to a bus line (reference sign omitted). The network I/F 112 is connected to the Internet 6. The operation unit 114 comprises numeric keys. The user may input various types of instructions to the MFP 100 by operating the operation unit 114. The display unit 116 is a display for displaying various types of information. The display unit 116 is a so-called touch panel, and also functions as an operation unit. The PSTN I/F 118 is an I/F configured to execute FAX communication.

The controller 120 comprises a CPU 122 and a memory 124. The CPU 122 is configured to execute various types of processes in accordance with programs 126, 128 stored in the memory 124. The memory 124 is constituted of a volatile memory, a non-volatile memory, and/or the like. The memory 124 stores the operating system (OS) program 126 for realizing basic processes, the server program 128 for accessing the server 10, and FAX setting information 130. The FAX setting information 130 indicates one of values including "FAX to Email" indicating use of the "FAX to Email" function, "FAX to Cloud" indicating use of the "FAX to Cloud" function, and "Regular FAX" indicating using neither the "FAX to Email" nor "FAX to Cloud". The FAX setting information 130 is inputted by the user operating the operation unit 114. The FAX setting information 130 is set to the "Regular FAX" in its default setting.

A device ID "d01" is assigned to the MFP 100. The MFP 200 comprises a similar configuration to that of the MFP 100. A device ID "d02" is assigned to the MFP 200.

Figure 2:
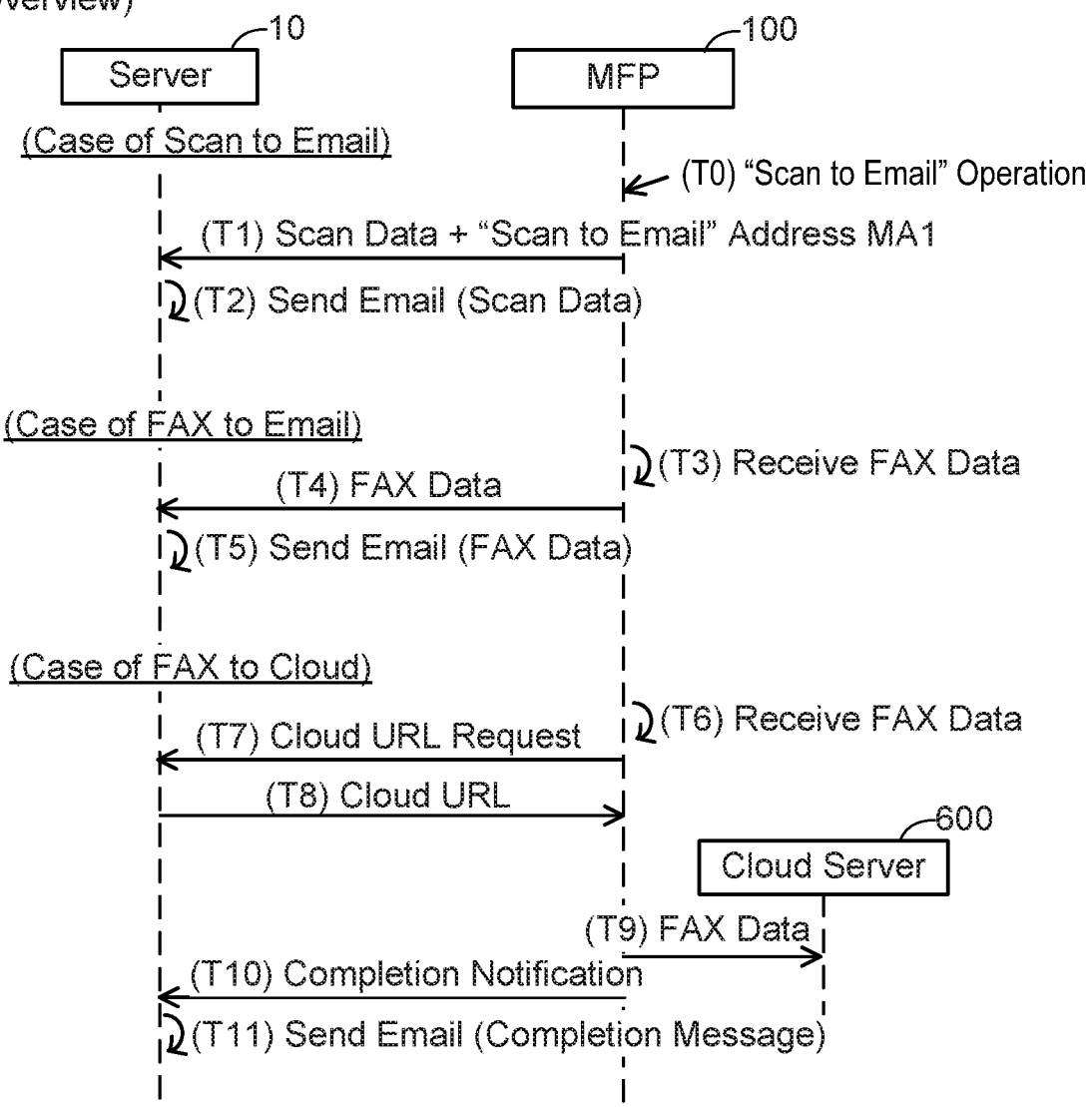
FIG. 2 shows a sequence diagram of an overview of each function.

Overview; FIG. 2

With reference to FIG. 2, an overview of the email function will be described. Processes of FIG. 2 are realized by processes of FIGS. 3 to 8, which will be described below. A preparation by the user will be described before explaining the overview of the email function. The user operates the operation unit 114 of the MFP 100 to input "Scan to Email" addresses MA1, MA2 for "Scan to Email". When the respective addresses MA1, MA2 have been inputted, the MFP 100 sends a storing request including the addresses MA1, MA2 and the device ID "d01" of the MFP 100 to the server 10. Due to this, the server 10 stores the respective addresses MA1, MA2 and the device ID "d01" in the email table 30. Further, the server 10 stores the respective addresses MA1, MA2, the device ID "d01", and the restriction flag "OFF" in the restriction table 34. An address MA3 for "FAX to Email" (hereafter "FAX to Email" address MA3) and an address MA3 for "FAX to Cloud" (hereafter "FAX to Cloud" address MA3) are also stored in the email table 30 and the restriction table 34, respectively.

Scan to Email

In T0, the user operates the operation unit 114 of the MFP 100 to perform a "Scan to Email" operation. The "Scan to Email" operation includes an operation of selecting the "Scan to Email" address MA1 from among the "Scan to Email" addresses MA1, MA2 and an operation of instructing to execute the scan function.

The MFP 100 creates scan data (i.e. image data) by scanning a document in T0 in response to accepting the "Scan to Email" operation. Then, the MFP 100 sends the created scan data and the "Scan to Email" address MA1 to the server 10.

When the server 10 has received the scan data and the "Scan to Email" address MA1 from the MFP 100 in T1, the server 10 sends an email with an attachment of the scan data in T2 with the "Scan to Email" address MA1 as a destination.

FAX to Email

When the MFP 100 has received FAX data via the PSTN I/F 118 in T3, the MFP 100 sends the FAX data to the server 10 in T4. The FAX data is image data that is sent from a FAX device different from the MFP 100 to the MFP 100 via FAX communication. The FAX data is created by the FAX device scanning a document.

When the server 10 has received the FAX data from the MFP 100 in T4, the server 10 sends an email with an attachment of the FAX data in T5 with the "FAX to Email" address MA3 as a destination.

FAX to Cloud

When the MFP 100 has received the FAX data via the PSTN I/F 118 in T6, the MFP 100 sends a Cloud URL request requesting the Cloud URL 36 to the server 10 in T7. Due to this, in T8, the MFP 100 receives the Cloud URL 36 from the server 10.

In T9, the MFP 100 sends the FAX data received in T6 to the Cloud server 600 indicated by the Cloud URL 36 received in T8. Due to this, the FAX data is stored in the Cloud server 600.

In T10, the MFP 100 sends a completion notification indicating that the sending of the FAX data to the Cloud server 600 has completed to the server 10.

When the server 10 has received the completion notification from the MFP 100 in T10, the server 10 sends an email in T11 including a completion message indicating that the sending of the FAX data to the Cloud server 600 has been completed, with the "Fax to Cloud" address MA3 as a destination.

Figure 3:
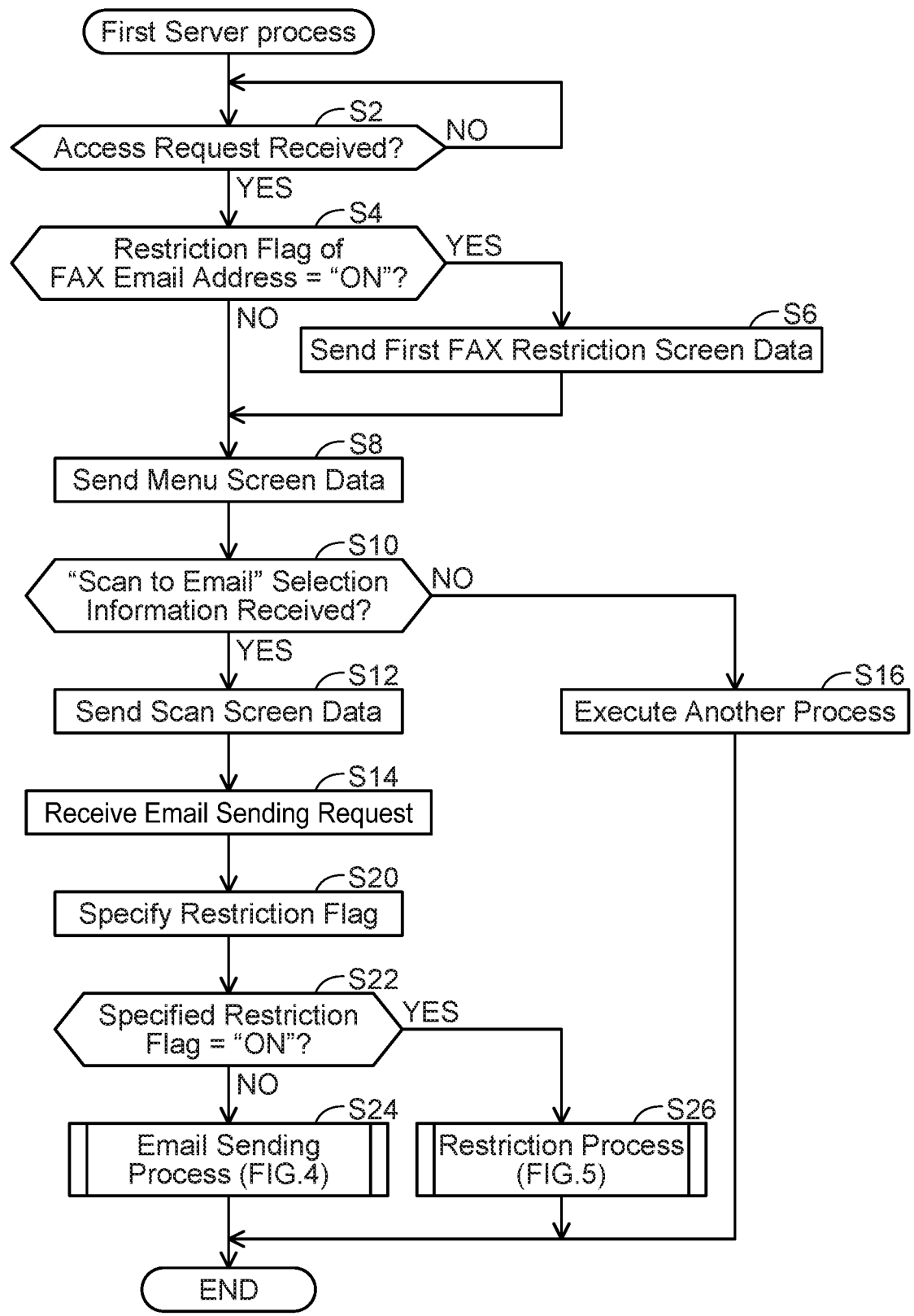
FIG. 3 shows a flowchart of a first server process.

First Server Process; FIG. 3

With reference to FIG. 3, a first server process executed by the CPU 22 of the server 10 be described. The first server process is a process for mainly executing the "Scan to Email" function. The first server process is started with power of the server 10 being turned on as a trigger.

In S2, the CPU 22 monitors reception of an access request from a specific MFP (such as 100) via the network I/F 12. The access request is information that is sent from the specific MFP in a case where a program use operation for using the server program 128 is performed on the specific MFP. The access request includes a device ID of the specific MFP (such as "d01"). The CPU 22 proceeds to S4 in a case of receiving the access request from the specific MFP (YES to S2).

In S4, the CPU 22 specifies, from the email table 30, a FAX email address that is stored in association with the device ID included in the access request. Here, the "FAX email address" indicates a "FAX to Email" address and a "Fax to Cloud" address. The CPU 22 specifies the restriction flag stored in association with both the device ID included in the access request and the specified FAX email address from the restriction table 34. Then, the CPU 22 determines whether or not the specified restriction flag indicates "ON". The CPU 22 proceeds to S6 in a case of determining that the specified restriction flag indicates "ON" (YES to S4). Contrary to this, the CPU 22 skips S6 and proceeds to S8 in case of determining that the specified restriction flag indicates "OFF" (NO to S4).

In S6, the CPU 22 sends first FAX restriction screen data for causing the specific MFP to display a first FAX restriction screen to the specific MFP via the network I/F 12. The first FAX restriction screen indicates that the sending of an email with the FAX email address as a destination has been restricted.

In S8, the CPU 22 sends menu screen data for causing the specific MFP to display a menu screen to the specific MFP via the network I/F 12. The menu screen is a screen for using the email function. The menu screen includes a "Scan to Email" button for executing a scan in accordance with the "Scan to Email" function and a setting button for inputting information for using the email function (such as the "FAX to Email" address and the FAX setting information 130).

In S10, the CPU 22 determines whether or not "Scan to Email" selection information is received from the specific MFP via the network I/F 12. The "Scan to Email" selection information is information which indicates that the "Scan to Email" button has been selected in the menu screen. The CPU 22 proceeds to S12 in a case of determining that the "Scan to Email" selection information has been received from the specific MFP (YES to S10). Meanwhile, in a case where the setting button has been selected in the menu screen and a storing request including a "FAX to Email" address has been received, for example (NO to S10), the CPU 22 proceeds to S16. In S16, for example, the CPU 22 stores the "Fax to Email" address included in the storing request in accordance with the aforementioned storing request in the email table 30. When S16 is completed, the process of FIG. 3 is terminated.

In S12, the CPU 22 sends scan screen data for causing the specific MFP to display a scan screen to the specific MFP via the network I/F 12. The scan screen data includes one or mote "Scan to Email" addresses stored in association with the device ID of the specific MFP. The scan screen includes an input box for inputting scan setting (such as data format, size, and resolution), a selection box for selecting one from among the one or more "Scan to Email" email addresses, and a Scan button for instructing to execute the scan function.

In S14, the CPU 22 receives an email sending request from the specific MFP via the network I/F 12. The email sending request is a command for requesting the sending of an email in accordance with information in the email sending request. The email sending request includes an email address that has been selected in the selection box in the scan screen, scan data that has been created in accordance with the scan setting inputted in the input box in the scan screen, and the device ID of the specific MFP. Here, the process of T1 in FIG. 2 is realized by the process of S14.

In S20, the CPU 22 specifies, from the restriction table 34, the restriction flag stored in association with the information included in the email sending request, that is, with both the device ID and the email address.

In S22, the CPU 22 determines whether the specified restriction flag indicates "ON". In a case of determining that the specified restriction flag indicates "OFF" (NO to S22), the CPU 22 executes an email sending process that is to be described below (see FIG. 4) in S24. On the other hand, in a case of determining that the specified restriction flag indicates "ON" (YES to S22), the CPU 22 executes a restriction process that is to be described below (see FIG. 5). When S24 or S26 is completed, the process of FIG. 3 is terminated.

Figure 4:
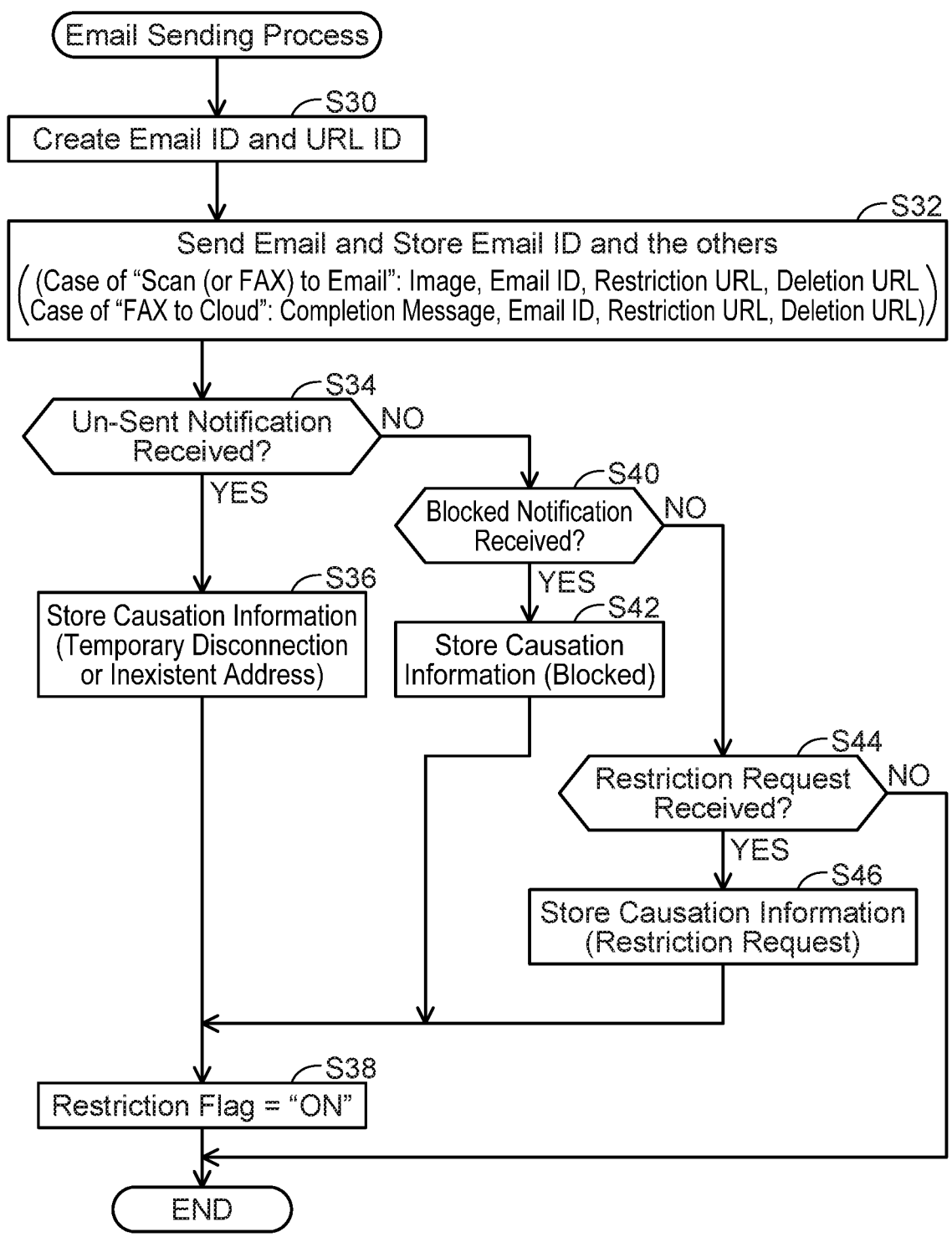
FIG. 4 shows a flowchart of an email sending process.

Email Sending Process; FIG. 4

With reference to FIG. 4, the email sending process executed by the CPU 22 of the server 10 will be described. In S30, the CPU 22 creates a unique email ID and a unique URL ID.

In S32, the CPU 22 creates an email which includes a header in which the email ID created in S30 is described and a predetermined body, and with the scan data in the email sending request received in S14 of FIG. 3 being attached. The predetermined body includes a restriction URL including the URL ID created in S30 and a deletion URL including the URL ID created in S30. The CPU 22 sends the created email with the email address in the email sending request as a destination. Further, the CPU 22 stores the device ID in the email sending request, the email address in the email sending request, the email ID created in S30, the URL ID created in S30, and the timestamp indicating a date and time at which the above email was sent in association with each other in the sending table 32.

In S34, the CPU 22 determines whether an unsent notification in response to the email sent in S32 (i.e., server email) has been received. The unsent notification is information for notifying an error that the server email cannot be sent to the destination. The unsent notification includes an error code indicating a causation of the error why the server email cannot be sent to the destination. The unsent notification is received via an email server (not shown). For example, in a case where the server email cannot be sent to the destination due to the causation "Temporary Disconnection", the unsent notification includes an error code EC1. Further, in a case where the server email cannot be sent to the destination due to the causation "Inexistent Address", the unsent notification includes an error code EC2 different from the error code EC1. Further, the unsent notification includes the email ID included in the header of the server email. The CPU 22 proceeds to S36 in a case of determining that the unsent notification has been received (YES to S34).

In S36, the CPU 22 stores causation information indicated by an error code included in the unsent notification (such as "Temporary Disconnection") in association with the email ID included in the unsent notification in the sending table 32.

In S38, the CPU 22 specifies, from the sending table 32, information stored in association with the email ID included in the unsent notification. Then, the CPU 22 changes the restriction flag stored in association with both the device ID and the email address from "OFF" to "ON" in the specified information in the restriction table 34. When S38 is completed, the process of FIG. 4 is terminated.

Further, in a case of determining that the unsent notification has not been received (NO to S34), the CPU 22 determines whether a blocked notification in response to the server email has been received in S40. The blocked notification indicates that the server email has been blocked by the destination of the server email. The blocked notification includes the email ID included in the header of the server email. The blocked notification is received via the email server (not shown). In a case of determining that the blocked notification has been received (YES to S40), the CPU 22 proceeds to S42.

In S42, the CPU 22 stores the causation information indicated by the blocked notification (i.e., "Blocked") in association with the email ID included in the blocked notification in the sending table 32. When S42 is completed, the CPU 22 proceeds to S38. In S38 executed after S42, the CPU 22 uses the email ID included in the blocked notification to specify information from the sending table 32 and changes the restriction flag stored in association with the specified information from "OFF" to "ON".

Further, in a case of determining that the blocked notification has not been received (NO to S40), the CPU 22 determines whether a restriction request in response to the server email has been received in S44. The restriction request is information that is received without an intervention of an email server from a terminal device (such as 500) at which the server email is being displayed in a case where the restriction URL in the body of the server email is clicked. The restriction request is a request for changing the restriction flag stored in association with the destination of the server email from "OFF" to "ON". The restriction request includes the URL ID included in the restriction URL. In a case of determining that the restriction, request has been received (YES to S44), the CPU 22 proceeds to S46.

In S46, the CPU 22 stores the causation information indicated by the restriction request (i.e. "Restriction Request") in association with the URL ID included in the restriction request in the sending table 32. When S46 is completed, the CPU 22 proceeds to S38. In S38 executed after S46, the CPU 22 uses the URL ID included in the restriction request to specify information from the sending table 32 and changes the restriction flag stored in association with the specified information from "OFF" to "ON".

Further, in a case of determining that the restriction request has not been received (NO to S44), the CPU 22 skips S38 and terminates the process of FIG. 4.

Figure 5:
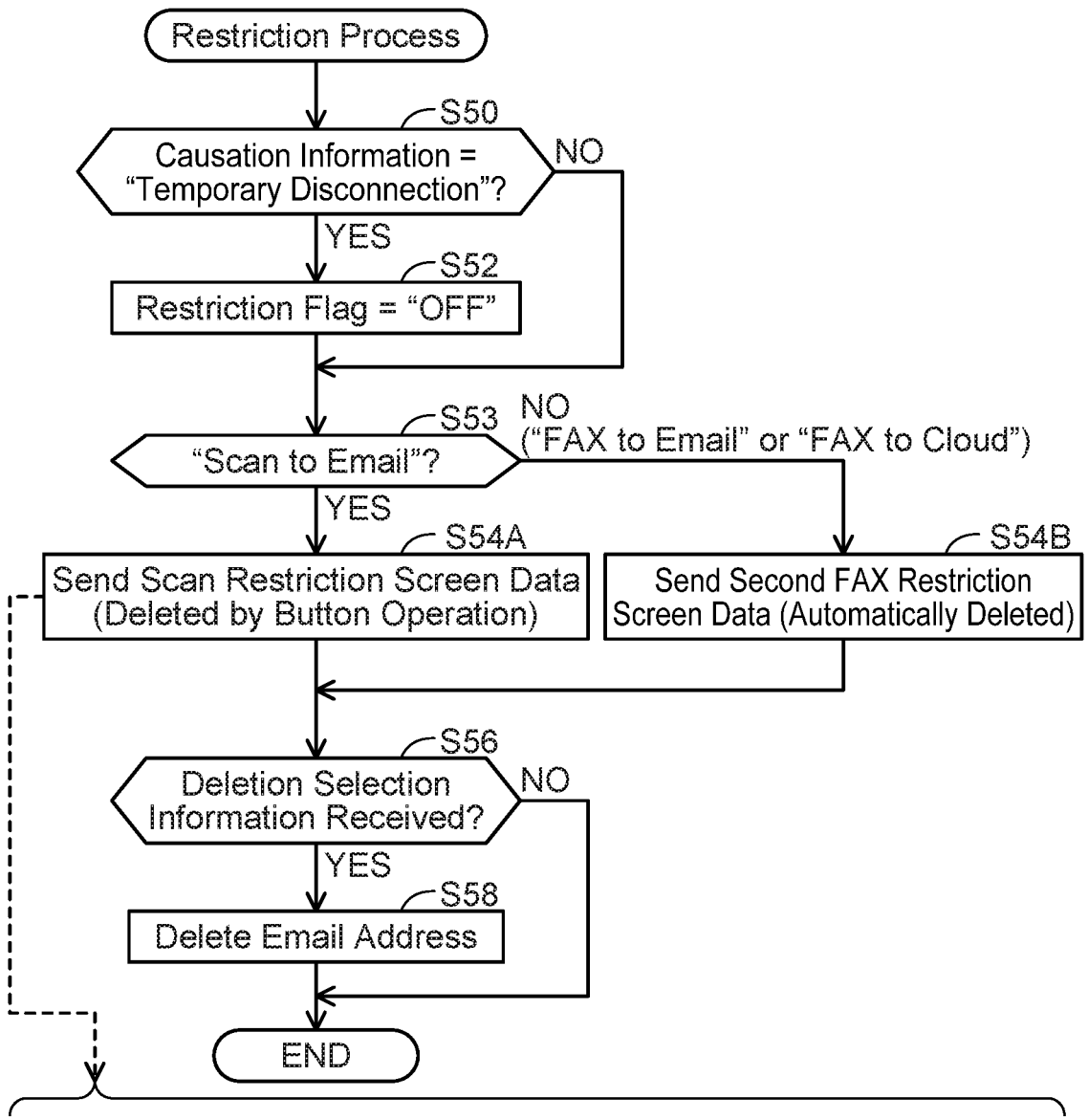
FIG. 5 shows a flowchart of a restriction process.

Restriction Process; FIG. 5

With reference to FIG. 5, the restriction process executed by the CPU 22 of the server 10 will be described. In S50, the CPU 22 specifies the causation information stored in association with the information included in the email sending request received in S14 of FIG. 3 (i.e. the device ID and email address) from the sending table 32. Then, the CPU 22 determines whether the specified causation information indicates "Temporary Disconnection". In a case of determining that the specified causation information indicates "Temporary Disconnection" (YES to S50), the CPU 22 changes the restriction flag specified in S20 of FIG. 3 from "ON" to "OFF" in S52. On the other hand, in a case of determining that the specified causation information does not indicate "Temporary Disconnection" (NO to S50), the CPU 22 skips S52 and proceeds to S53. The indication "Temporary Disconnection" of the causation information means that a temporary error has occurred. In this case, there is a possibility that the temporary error may be resolved so that the email can be sent to its destination. By changing the restriction flag to "OFF" when the causation information indicates "Temporary Disconnection", the email can be appropriately sent when the temporary error has been resolved.

In S53, the CPU 22 determines whether the restriction process has been executed in the first server process of FIG. 3 (i.e. process for the "Scan to Email" function). Although details of this will be described below, the restriction process of FIG. 5 is executed also in a second server process (see FIG. 6). In a case of determining that the restriction process has been executed in the first server process (YES to S53), the CPU 22 proceeds to S54A.

In S54A, the CPU 22 sends Scan restriction screen data for causing the specific MFP to display a Scan restriction screen to the specific MFP via the network I/F 12. The Scan restriction screen indicates that the sending of an email with a "Scan to Email" address as a destination has been restricted. The Scan restriction screen includes a causation message indicating a causation why the sending of the email is restricted, a deletion button for instructing deletion of the email address, and a NO button. The deletion button is associated with the information included in the email sending request received in S14 of FIG. 3 (i.e., device ID and email address). In a case where the deletion button or the NO button is selected, the Scan restriction screen is deleted from the displaying unit of the specific MFP.

The causation message is a message indicating a causation indicated by the causation information specified in S50. That is, as shown in FIG. 5, the Scan restriction screen includes various messages depending on the causation why the sending of an email has been restricted. Due to this, the user may acknowledge the causation why the sending of the email has been restricted.

The CPU 22 proceeds to S54B in a case of determining that the restriction process has been executed in the second server process to be described later (i.e. process for "FAX to Email" function and "FAX to Cloud" function) (NO for S53). In S54B, the CPU 22 sends second FAX restriction screen data for causing the specific MFP to display a second FAX restriction screen to the specific MFP via the network I/F 12. The second FAX restriction screen indicates that the sending of an email with a FAX email address as a destination has been restricted. The second FAX restriction screen is different from the first FAX restriction screen of S6 in FIG. 3. The second FAX restriction screen includes a causation message similar to that of the Scan restriction screen, a deletion button, and a NO button. Contrary to this, the first FAX restriction screen does not include a deletion button. Further, the second FAX restriction screen is automatically deleted from the displaying unit of the specific MFP even without any button being selected in the second FAX restriction screen. Contrary to this, the first FAX restriction screen is deleted from the displaying unit of the specific MFP in response to the OK button being selected in the first FAX restriction screen. In other words, the first FAX restriction screen remains displayed until the OK button is selected in the first FAX restriction screen. When S54A or S54B is completed, the CPU 22 proceeds to S56.

In S56, the CPU 22 determines whether deletion selection information is received from the specific MFP via the network I/F 12. The deletion selection information is information indicating that the deletion button has been selected in the Scan restriction screen or the second FAX restriction screen. The deletion selection information includes information associated with the deletion button (i.e. device ID and email address). The CPU 22 proceeds to S58 in a case of determining that the deletion selection information has been received from the specific MFP (YES to S56), while the CPU 22 skips the process of S58 and terminates the process of FIG. 5 in a case of determining that the deletion selection information has not been received from the specific MFP (NO to S56).

In S58, the CPU 22 deletes an email address that matches the email address in the deletion selection information among the email addresses stored in the email table 30 in association with the device ID in the deletion selection information from the email table 30. Further, the CPU 22 deletes the same email address stored in association with the device ID in the deletion selection information from the restriction table 34. When the process of S58 is completed, the process of FIG. 5 is terminated.

Second Server Process

Figure 6:
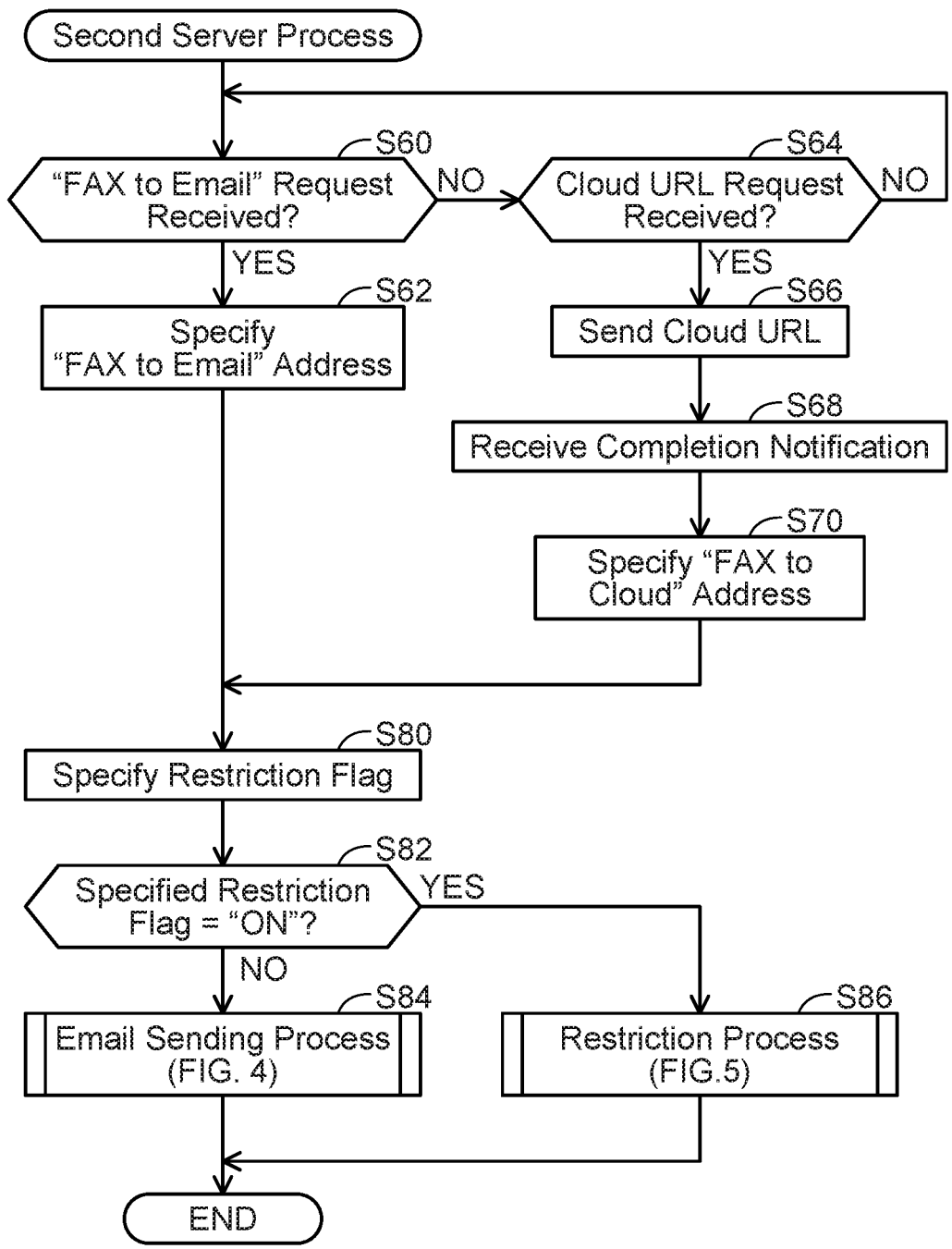
FIG. 6 shows a flowchart of a second server process.

With reference to FIG. 6, the second server process executed by the CPU 22 of the server 10 will be described. The second server process is a process for executing the "FAX to Email" function and the "FAX to Cloud" function. The second server process is started with the power of the server 10 being turned on as a trigger.

In S60, the CPU 22 monitors reception of a "FAX to Email" request from the specific MFP via the network I/F 12. The "FAX to Email" request is information which is sent from the specific MFP in a case where the specific MFP receives FAX data. The "FAX to Email" request includes the FAX data and the device ID of the specific MFP. T4 of FIG. 2 is realized by the process of S60. The CPU 22 proceeds to S62 in a case of receiving the "FAX to Email" request from the specific MFP (YES to S60).

In S62, the CPU 22 specifies the "FAX to Email" address stored in association with the device ID included in the "FAX to Email" request from the email table 30. The CPU 22 proceeds to S80 when the process of S62 is completed.

Further, in addition to the monitoring of S60, the CPU 22 monitors reception of a Cloud URL request from the specific MFP via the network I/F 12 in S64. In a case of receiving the Cloud URL request from the specific MFP (YES to S64), the CPU 22 sends the Cloud URL 36 in the memory 24 to the specific MFP via the network I/F 12 in S66. Subsequently, in S68, the CPU 22 receives a completion notification indicating that the sending of the FAX data to the Cloud server 600 has been completed from the specific MFP via the network I/F 12. The completion notification includes the device ID of the specific MFP. Here, the processes of T7, T8, and T10 of FIG. 2 are realized by the processes of S64 to S68.

In S70, the CPU 22 specifies the "FAX to Cloud" address stored in association with the device ID included in the completion notification from the email table 30. When the process of S70 is completed, the CPU 22 proceeds to S80.

In S80, the CPU 22 specifies a restriction flag from the restriction table 34. Specifically, in S80 executed after S62, the CPU 22 specifies the restriction flag stored in association with both the device ID included in the "FAX to Email" request and the "FAX to Email" address specified in S62 from the restriction table 34. On the other hand, in S80 executed after S70, the CPU 22 specifies the restriction flag stored in association with both the device ID included in the completion notification and the "FAX to Cloud" address specified in S70 from the restriction table 34.

S82 to S86 are similar to S22 to S26 of FIG. 3. When S84 or S86 is completed, the process of FIG. 6 is terminated.

Figure 7:
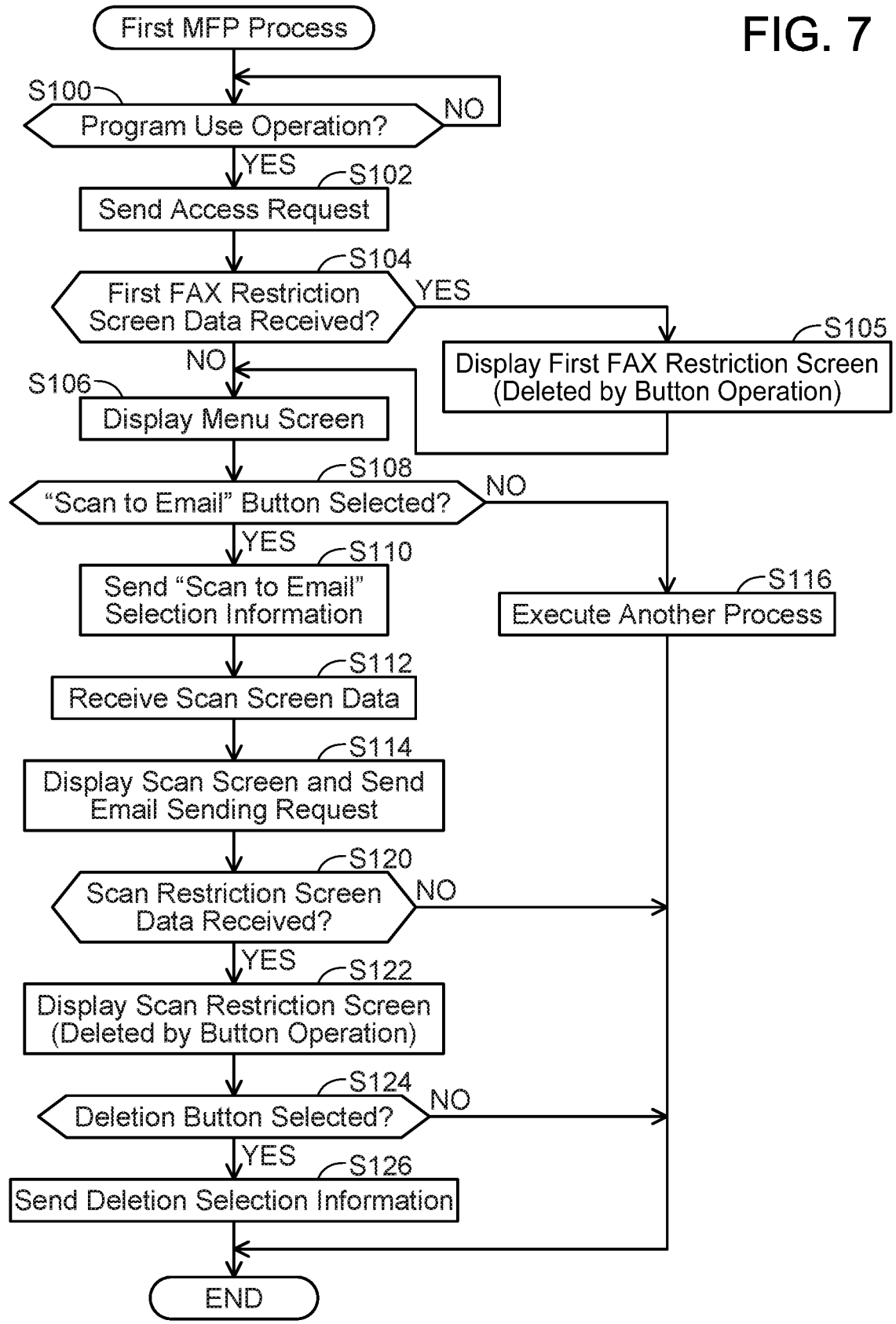
FIG. 7 shows a flowchart of a first MFP process.

First MFP process; FIG. 7

With reference to FIG. 7, a first MFP process executed by the CPU 122 of the MFP 100 will be described. The first MFP process is a process for mainly executing the "Scan to Email" function. The first MFP process is started with power of the MFP 100 being turned on as a trigger.

In S100, the CPU 122 monitors the program use operation being performed on the operation unit 114. The CPU 122 proceeds to S102 in accordance with the server program 128 in a case where the program use operation is performed (YES to S100).

In S102, the CPU 122 sends the access request to the server 10 via the network I/F 112 (see S2 of FIG. 3).

In S104, the CPU 122 determines whether the first FAX restriction screen data is received from the server 10 via the network I/F 112 (see S6 of FIG. 3). In a case of determining that the first FAX restriction screen data has been received from the server 10 (YES to S104), the CPU 122 displays the first FAX restriction screen on the displaying unit 116 in accordance with the first FAX restriction screen data in S105. Then, the CPU 122 receives menu screen data from the server 10 via the network I/F 112. On the other hand, in a case of receiving the menu screen data from the server 10 without receiving the first FAX restriction screen data from the server 10 (NO to S104), the CPU 122 skips the process of S105 and proceeds to S106.

In S106, the CPU 122 displays a menu screen in accordance with the menu screen data on the displaying unit 116.

In S108, the CPU 122 determines whether a "Scan to Email" button is selected in the menu screen. In a case of determining that the "Scan to Email" button has been selected (YES to S108), the CPU 122 proceeds to S110, whereas in a case of determining that a setting button in the menu screen has ben selected (NO to S108), the CPU 122 proceeds to S116. In S116, the CPU 122 displays an inputting screen for inputting information for using the email function (such as "FAX to Email" address), for example. When the process of S116 is completed, the process of FIG. 7 is terminated.

In S110, the CPU 122 sends the "Scan to Email" selection information to the server 10 via the network I/F 112 (see S10 of FIG. 3).

In S112, the CPU 122 receives the scan screen data from the server 10 via the network I/F 112 (see S12 of FIG. 3).

In S114, the CPU 122 displays the scan screen in accordance with the scan screen data on the displaying unit 116. In a case where the inputting of the scan setting, the selection of email address, and the selection of the Scan button have been performed in the scan screen, the CPU 122 causes the scan executing unit 119 to execute a scan in accordance with the inputted scan setting. Then, the CPU 122 sends the email sending request including the selected email address, the scan data created by the scan executing unit 119 and the device ID "d01" of the MFP 100 to the server 10 (see S14 of FIG. 3).

In S120, the CPU 122 determines whether the Scan restriction screen data is received from the server 10 via the network I/F 122 (see S54A of FIG. 5). In a case of determining that the Scan restriction screen data has been received from the server 10 (YES to S120), the CPU 122 proceeds to S122. On the other hand, in a case of determining that the Scan restriction screen data has not been received from the server 10 (NO to S122), the CPU 122 skips processes from S122, and terminates the process of FIG. 7.

In S122, the CPU 122 displays the Scan restriction screen in accordance with the Scan restriction screen data on the displaying unit 116.

In S124, the CPU 122 determines whether the deletion button in the Scan restriction screen has been selected. In a case of determining that the deletion button has been selected (YES to S124), in S126 the CPU 122 sends the deletion selection information to the server 10 via the network I/F 112 (see S56 of FIG. 5). When the process of S126 is completed, the process of FIG. 7 is terminated. On the other hand, in a case of determining that the NO button has been selected (NO to S124), the CPU 122 skips the process of S126, and terminates the process of FIG. 7. Here, in a case where the deletion button or the NO button has been selected, the Scan restriction screen is deleted.

Figure 8:
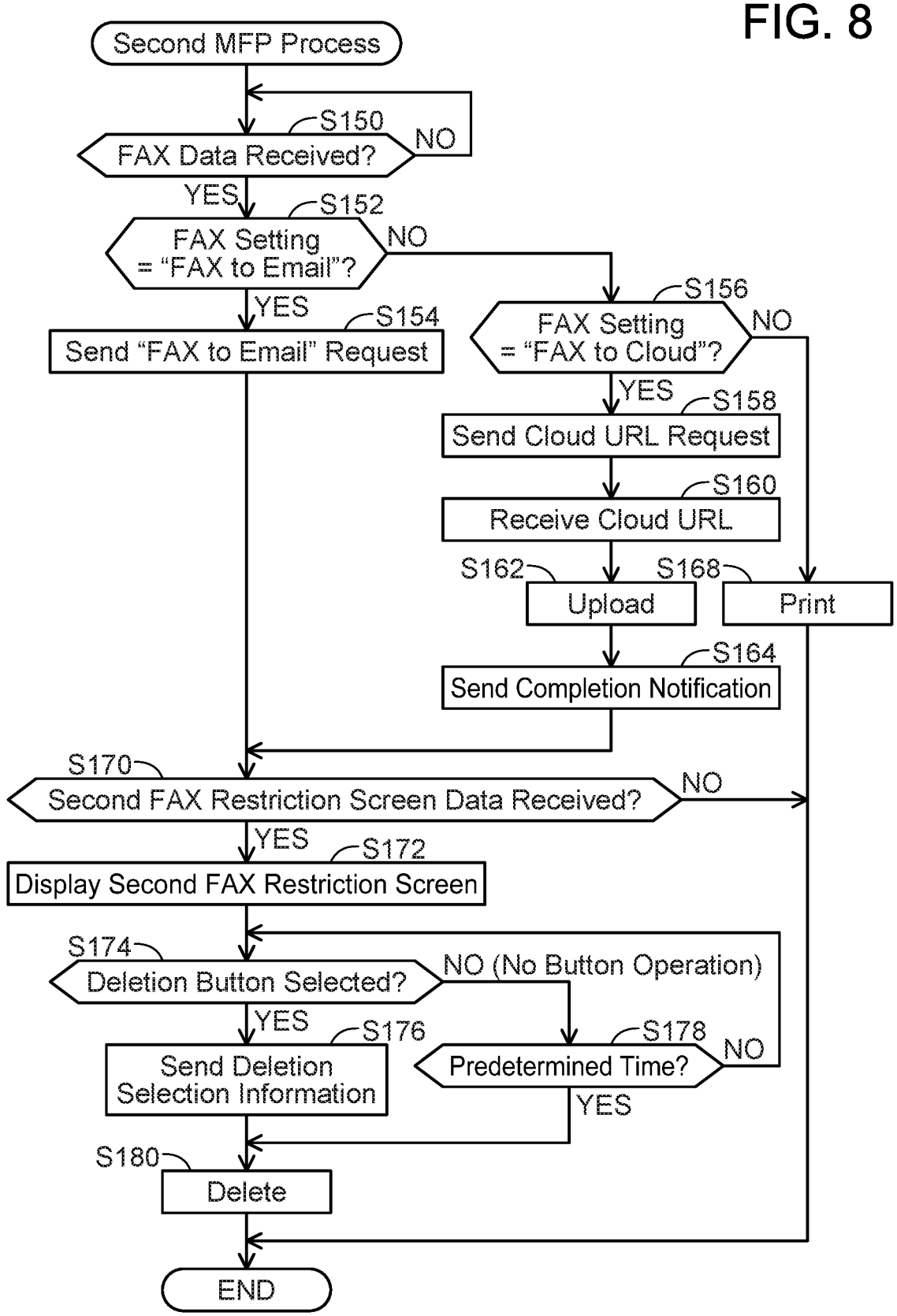
FIG. 8 shows a flowchart of a second MFP process.

Second MFP Process; FIG. 8

With reference to FIG. 8, a second MFP process executed by the CPU 122 of the MFP 100 will be described. The second MFP process is a process for executing the "FAX to Email" function and the "FAX to Cloud" function. The second MFP process is started with the power of the MFP 100 being turned on as a trigger.

In S150, the CPU 122 monitors reception of the FAX data via the PSTN I/F 118. The processes of T3 and T6 of FIG. 2 are realized by the process of S150. In a case of receiving the FAX data (YES to S150), the CPU 122 proceeds to S152.

In S152, the CPU 122 determines whether the FAX setting information 130 in the memory 124 indicates the "FAX to Email". In a case of determining that the FAX setting information 130 indicates the "FAX to Email" (YES to S152), the CPU 122 proceeds to S154.

In S154, the CPU 122 sends the "FAX to Email" request including the FAX data and the device ID "d01" of the MFP 100 to the server 10 via the network I/F 112 (see S60 of FIG. 6). When the process of S154 is completed, the CPU 122 proceeds to S170.

Contrary to this, in a case of determining that the FAX setting information 130 does not indicate the "FAX to Email" (NO to S152), the CPU 122 determines whether the FAX setting information 130 indicates the "FAX to Cloud" in S156. In a case of determining that the FAX setting information 130 indicates the "FAX to Cloud" (YES to S156), the CPU 122 proceeds to S158.

In S158, the CPU 122 sends the Cloud URL request to the server 10 via the network I/F 112 (see S66 of FIG. 6). In S160, the CPU 122 receives the Cloud URL 36 from the server 10 via the network I/F 112 (see S68).

In S162, the CPU 122 sends (i.e. uploads) the FAX data to the Cloud server 600 indicated by the Cloud URL 36. Here, the process of T9 of FIG. 2 is realized by the process of S162.

In S164, the CPU 122 sends a completion notification including the device ID "d01" the server 10 via the network I/F 112 (see S68 of FIG. 6). When the process of S164 is completed, the CPU 122 proceeds to S170.

On the other hand, in a case of determining that the FAX setting information 130 indicates the "Regular FAX" (NO to S156), the CPU 122 proceeds to S168. In S168, the CPU 122 causes a print executing unit (not shown) of the MFP 100 to print an image corresponding to the FAX data. When the process of S168 is completed, the process of FIG. 8 is terminated.

In S170, the CPU 122 determines whether the second FAX restriction screen data has been received from the server 10 via the network I/F 112 (see S54B of FIG. 5). In a case of determining that the second FAX restriction screen data has been received from the server 10 (YES to S170), the CPU 122 proceeds to S172, whereas in a case of determining that the second FAX restriction screen data has not been received from the server 10 (NO to S170), the CPU 122 skips processes from S172, and terminates the process of FIG. 8.

In S172, the CPU 122 displays the second FAX restriction screen n the displaying unit 116 in accordance with the second FAX restriction screen data.

In S174, the CPU 122 determines whether the deletion button in the second FAX restriction screen has been selected. In a case of determining that the deletion button has been selected (YES to S174), the CPU 122 proceeds to S176. S176 is similar to S126 of FIG. 7. Then, the CPU 122 deletes the second FAX restriction screen from the displaying unit 116 in S180. Here, also in a case where the NO button in the second FAX restriction screen has been selected, the CPU 122 deletes the second FAX restriction screen from the displaying unit 116 in S180. When S180 is completed, the process of FIG. 8 is terminated.

Further, in a case of determining that none of the buttons in the second FAX restriction screen has been selected (NO to S174), the CPU 122 determines in S178 whether a predetermined time (e.g., thirty seconds) has elapsed since the display of the second FAX restriction screen. In a case of determining that the predetermined time has elapsed (YES to S178), the CPU 112 proceeds to S180. That is, the second FAX restriction screen is automatically deleted from the displaying unit 116. On the other hand, in a case of determining that the predetermined time has not elapsed (NO to S178), the CPU 122 returns to S174.

Figure 9:
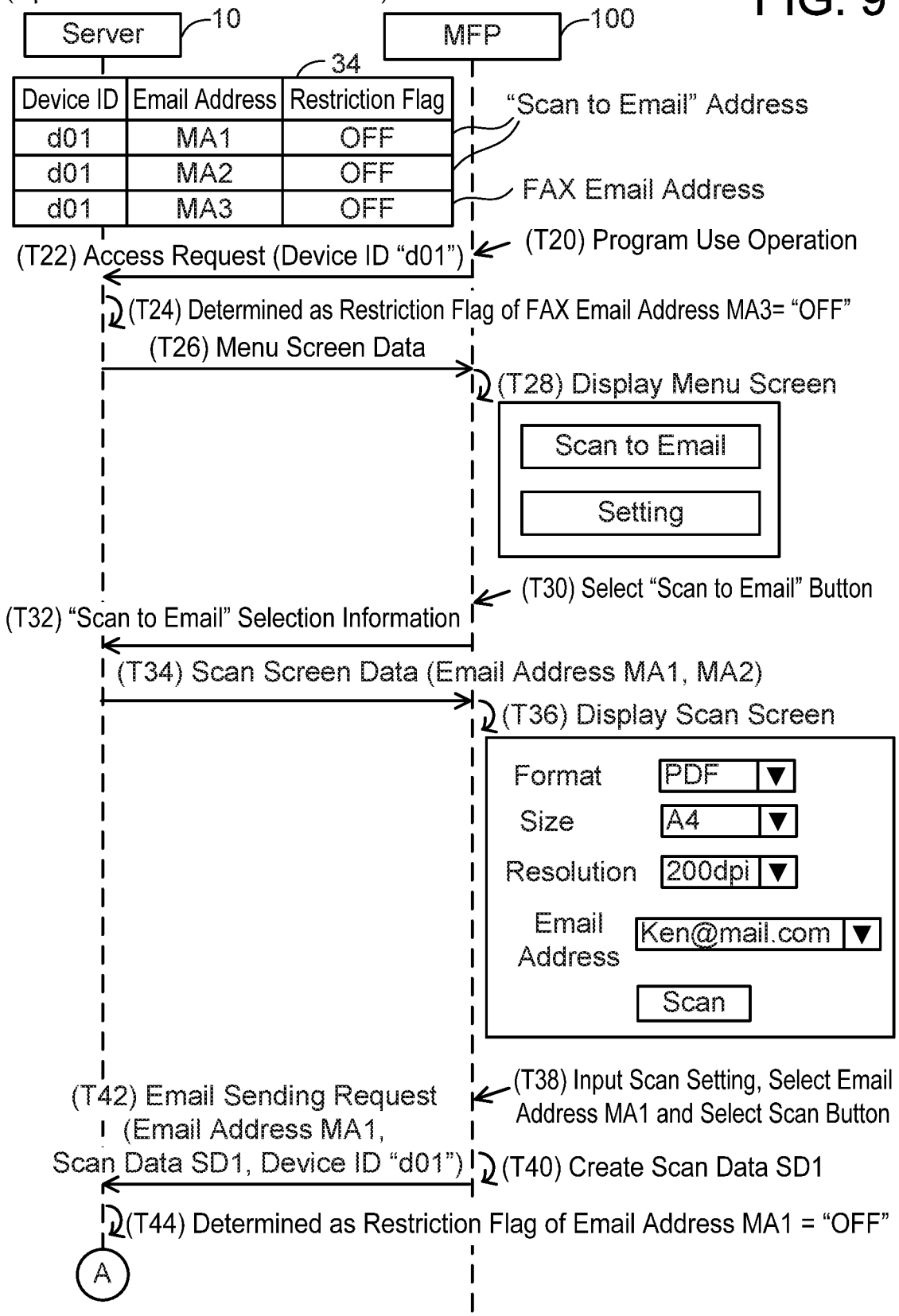
FIG. 9 shows a specific case in Scan to Email.

Specific Cases in Scan to Email; FIGS. 9 to 11

With reference to FIGS. 9 to 11, specific cases in "Scan to Email" will be described. In the present cases, two email addresses MA1, MA2 have been stored as "Scan to Email" addresses, and the email address MA3 has been stored as a FAX email address. Further, in the restriction table 34, each of the three email addresses MA1 to MA3 has been stored in association with the device ID "d01" of the MFP 100, and the restriction flag "OFF" has been stored in association with each of the email addresses MA1 to MA3.

In T20, the MFP 100 accepts the program use operation by the user (YES to S100 in FIG. 7). In T22, the MFP 100 sends the access request including the device ID "d01" to the server 10 (S102).

When the access request is received from the MFP 100 in T22 (YES to S2 of FIG. 3), the server 10 specifies in T24 the restriction flag "OFF" stored in association with both the device ID "d01" and the FAX email address MA3 from the restriction table 34. Then, the server 10 determines that the specified restriction flag indicates "OFF" (NO to S4). In T26, the server 10 sends the menu screen data to the MFP 100 (S8).

When the menu screen data is received from the server 10 in T26, the MFP 100 displays the menu screen in T28 (S106 of FIG. 7). In T30, the MFP 100 accepts a selection of the "Scan to Email" button in the menu screen (YES to S108). In T32, the MFP 100 sends the "Scan to Email" selection information to the server 10 (S110).

When the "Scan to Email" selection information is received from the MFP 100 in T32 (YES to S10 of FIG. 3), the server 10 sends scan screen data including the two "Scan to Email" email addresses MA1, MA2 stored in association with the device ID "d01" to the MFP 100 in T34 (S12).

When the scan screen data is received from the server 10 in T34 (S112 of FIG. 7), the MFP 100 displays a scan screen in T36 (S114).

In T38, the MFP 100 accepts an input of a scan setting, a selection of the "Scan to Email" address MA1, and a selection of the Scan button in the scan screen. In T40, the MFP 100 creates scan data SD1 in accordance with the inputted scan setting.

In T42, the MFP 100 sends an email sending request including the "Scan to Email" address MA1, the scan data SD1, and the device ID "d01" to the server 10 (S114).

When the email sending request is received from the MFP 100 in T42 (S14 of FIG. 3), the server 10 specifies the restriction flag "OFF" stored in association with both the device ID "d01" and the "Scan to Email" address MA1 (S20). In T44, the server 10 determines that the specified restriction flag is "OFF" (NO to S22).

Subsequently, in T50 of FIG. 10, the server 10 creates an email ID "m01" and a URL ID "u01" (S30 in FIG. 4).

In T52, the server 10 sends an email EM1 with the "Scan to Email" address MA1 as a destination (S32). The email EM1 includes a header in which the email ID "m01" is described and a body which includes a restriction URL including the URL ID "u01" and a deletion URL including the URL ID "u01". The scan data SD1 has been attached to the email EM1.

Further, the server 10 stores the device ID "d01" the "Scan to Email" address MA1, the email ID "m01", the URL ID "u01", and the timestamp of the email EM1 "2019.5.20.12:00" in association with each other in the sending table 32.

Cases A1 to A3

Subsequently, specific cases A1 to A3 regarding the email EM1 will be described. Case A1 indicates a case in which the causation of the alert is "Temporary Disconnection" or "Inexistent Address". In T54, the server 10 determines that an unsent notification in response to the email EM1 has been received (YES to S34 of FIG. 4). The unsent notification includes the email ID "m01" and the error code EC1 (or EC2).

In T56, the server 10 stores the causation information "Temporary Disconnection" (or "Inexistent Address") indicated by the error code EC1 (or EC2) included in the unsent notification in association with the email ID "m01" in the sending table 32 (S36).

In T58, the server 10 changes the restriction flag stored in association with both the device ID "d01" associated with the email ID "m01" and the "Scan to Email" address MA1 being the destination of the email EM1 from "OFF" to "ON" (S38).

Case A2 indicates a case in which the causation of the alert is "Blocked". In T74, the server 10 receives the blocked notification in response to the email EM1 due to, for example, a process for blocking being executed by a mailer which received the email EM1 being executed (YES to S40 of FIG. 4). This blocked notification includes the email ID "m01".

In T76, the server 10 stores the causation information "Blocked" in association with the email ID "m01" in the sending table 32 (S42). T78 is similar to T58.

Case A3 is a case in which the causation of the alert is "Restriction Request". In T80, in the terminal device 500 displaying the email EM1, the user clicks the restriction URL in the email EM1. Due to this, the server 10 receives the restriction request including the URL ID "u01" from the terminal device 500 in T84 (YES to S44).

In T86, the server 10 stores the causation information "Restriction Request" in association with the email ID "m01" in the sending table 32 (S46). T88 is similar to T58. Such a configuration enables the user to restrict sending of an email simply by clicking the restriction URL in the email EM1. Convenience for the user is improved.

Further, in Case A3, the user further clicks the deletion URL in the email EM1. Due to this, in T94, the server 10 receives the deletion request from the terminal device 500 without an intervention of any email server. The deletion request is a request to change the restriction flag stored in association with the destination of the email EM1 from "ON" to "OFF". The deletion request includes the URL ID "u01".

In T96, the server 10 specifies the information stored in association with the URL ID "u01" included in the deletion request, that is, the device ID "d01" and the "Scan to Email" address MA1. Then, the server 10 deletes the causation information "Restriction Request" stored in association with both the device ID "d01" and the "Scan to Email" address MA1.

In T98, the server 10 changes the restriction flag stored in association with both the device ID "d01" and the "Scan to Email" address MA1 from "ON" to "OFF". Such a configuration enables the user to delete the restriction flag "ON" by clicking the deletion URL in the email EM1 even when the user has erroneously clicked the restriction URL. An inadvertent restriction on the sending of an email can be suppressed.

Continuation of Case A2

Subsequently, with reference to FIG. 11, continuation of Case A2 will be described. In the continuation of Case A2, the user again uses the "Scan to Email" function in order to send an email with the "Scan to Email" address MA1 as a destination. Due to this, similar processes to T20 to T38 of FIG. 9 are executed. In T140, the MFP 100 creates scan data SD2 in accordance with the scan setting inputted in the scan screen. T142 is similar to T42 of FIG. 9 except that the scan data SD2 is included in the email sending request.

When the email sending request is received from the MFP 100 in T142 (S14 of FIG. 3), the server 10 specifies the restriction flag "ON" stored in association with both the device ID "d01" and the "Scan to Email" address MA1 (S20). In T144, the server 10 determines that the specified restriction flag is "ON" (YES to S22).

In T146, the server 10 determines that the causation information stored in association with both the device ID "d01" and the "Scan to Email" address MA1 is "Blocked" (NO to S50 of FIG. 5). Then in T148, the server 10 sends Scan restriction screen data for causing the MFP 100 to display a Scan restriction screen including a causation message indicating the causation "Blocked" to the MFP 100 (S54A).

When the Scan restriction screen data is received from the server 10 in T148 (YES to S120 in FIG. 7), the MFP 100 displays the Scan restriction screen (S122) in T150. Due to this, the user can acknowledge that the sending of an email with the "Scan to Email" address MA1 as a destination has been restricted.

Further, the Scan restriction screen is not displayed in a case where the "Scan to Email" address MA2 is selected in the scan screen, because the restriction flag stored in association with the "Scan to Email" address MA2 indicates "OFF" (NO to S22). That is, in the case where the "Scan to Email" address MA1 is selected, the Scan restriction screen is displayed, but in the case where the "Scan to Email" address MA2 is selected, the Scan restriction screen is not displayed. According to the configuration of the present case, the Scan restriction screen can be appropriately displayed depending on which "Scan to Email" address has been selected by the user.

In T152, the MFP 100 accepts a selection of the deletion button in the Scan restriction screen (YES to S124). In T154, the MFP 100 sends deletion selection information including information associated with the deletion button (i.e. the device ID "d01" and the "Scan to Email" address MA1) to the server 10 (S126).

When the deletion selection information is received from the MFP 100 in T154 (YES to S56 of FIG. 5), the server 10 deletes in T156 the "Scan to Email" address MA1 stored in association with the device ID "d01" from the email table 30 (S58). Due to this, the email address MA1, which was blocked by the mailer, can be deleted.

Further, in the present case, in the restriction table 34, the "Scan to Email address" MA1 has been stored in association with the device ID "d02" of the MFP 200, and the restriction flag "OFF" has been stored in association with both the device ID "d02" and the "Scan to Email" address MA1.

T220 is similar to T20 of FIG. 9 except that the MFP 200 accepts the program use operation. T222 to T232 are similar to T22 to T32 of FIG. 9 except that the MFP 200 is used instead of the MFP 100. T234 is similar to T34 of FIG. 9 except that the scan screen data includes only the "Scan to Email" address MA1. T236 and T238 are similar to T36 and T38 of FIG. 9 except that the MFP 200 is used instead of the MFP 100. T240 is similar to T40 of FIG. 9 except that scan data SD3 is created by the MFP 200.

In T242, the MFP 200 sends an email sending request including the "Scan to Email" address MA1, the scan data SD3, and the device ID "d02" to the server 10 (S114 of FIG. 7).

When the email sending request is received from the MFP 200 in T242 (S14 of FIG. 3), the server 10 specifies the restriction flag "OFF" stored in association with both the device ID "d02" and the "Scan to Email" address MA1 (S20). In T244, the server 10 determines that the specified restriction flag is "OFF" (NO to S22). In T252, the server 10 sends an email EM2 with an attachment of the scan data SD3 with the "Scan to Email" address MA1 as a destination (S32).

For example, a comparative example may be assumed in which in T78 of Case A2 in FIG. 10 the restriction flag "ON" is stored in the restriction table 34 not in association with the device ID "d01" but in association with the "Scan to Email" address MA1. In the comparative example, in a case where an email sending request including the "Scan to Email" address MA1 is received from the MFP 200 different from the MFP 100, the server 10 determines that the restriction flag stored in association with the "Scan to Email" address MA1 indicates "ON" and executes the restriction process of FIG. 5. For example, there may be a case where, even if the user of the MFP 100 wishes to block the email address MA1, a user of the MFP 200 does not wish to block the same email address MA1. In the configuration of the comparative example, there may be a case where, even if the user of the MFP 200 does not wish to block the email address MA1, the sending of an email with the email address MA1 as a destination is unnecessarily blocked. Contrary to this, according to the configuration of the present case, the server 10 stores the restriction flag in the restriction table 34 in association with each of the device ID "d01" and "d02", respectively. In the case where the server 10 changes the restriction flag stored in association with the device ID "d01" from "OFF" to "ON" (T78 of FIG. 10), the server 10 maintains the restriction flag stored in association with the device ID "d02" as "OFF". Due to this, in a case where the email sending request including the device ID "d02" is received from the MFP 200 (T242 of FIG. 11), the server 10 does not execute the restriction process, and sends the email EM2 (T252). According to the configuration of the present case, it is possible to suppress the unnecessary restriction on sending of an email with the email address MA1 as a destination in the case where the user of the MFP 200 does not wish to block the email address MA1.

Specific Case in FAX to Email; FIG. 12

With reference to FIG. 12, a specific case in FAX to Email will be described. In the present case, in the email table 30, the "FAX to Email" address MA3 has been stored in association with the device ID "d01" of the MFP 100. In the restriction table 34, the restriction flag "OFF" has been stored in association with both the device ID "d01" and the "FAX to Email" address MA3. Further, in the present case, the MFP 100 stores the FAX setting information 130 indicating "FAX to Email".

The MFP 100 receives FAX data FD1 via the PSTN I/F 118 in T310 (S150 of FIG. 8).

In T312, the MFP 100 determines that the FAX setting information 130 indicates "FAX to Email" (YES to S152). In T314, the MFP 100 sends a "FAX to Email" request including the FAX data FD1 and the device ID "d01" to the server 10 (S154).

When the "FAX to Email" request is received from the MFP 100 in T314 (YES to S60 of FIG. 6), the server 10 specifies the "FAX to Email" address MA3 stored in association with the device ID "d01" from the email table 30 (S62).

In T316, the server 10 determines that the restriction flag stored in association with both the device ID "d01" and the "FAX to Email" address MA3 indicates "OFF" in the restriction table 34 (NO to S82).

T350 is similar to T50 of FIG. 10 except that an email ID "m03" and a URL ID "u03" are created. In T352, the server 10 sends an email EM3 with the "FAX to Email" address MA3 as its destination (S32). The email EM3 includes a header in which the email ID "u03" is described and a body which includes a restriction URL including the URL ID "u03" and a deletion URL including the URL ID "u03". The FAX data FD1 has been attached to the email EM3.

Further, the server 10 stores the device ID "d01", the "FAX to Email" address MA3, the email ID "m03", the URL ID "u03", and the timestamp of the email EM3 "2019.5.20.12:00" in association with each other in the sending table 32.

In the present case, similar to Case A2 of FIG. 10, a process for blocking by a mailer which received the email EM3 is executed. In T374, the server 10 receives a blocked notification in response to the email EM3 (YES to S40 of FIG. 4). The blocked notification includes the email ID "m03".

T376 is similar to T76 of FIG. 10 except that the email ID "m03" is used. In T378, the server 10 changes the restriction flag stored in association with both the device ID "d01" associated with the email ID "m03" and the "FAX to Email" address MA3 which is the destination of the email EM3 from "OFF" to "ON" (S38).

Subsequently, the MFP 100 receives FAX data FD2 via the PSTN I/F 118 in T380 (S150 of FIG. 8). T384 is similar to T314 except that the "FAX to Email" request includes the FAX data FD2.

In T386, the server 10 determines that the restriction flag stored in association with both the device ID "d01" and the "FAX to Email" address MA3 in the restriction table 34 indicates "ON" (YES to S82 of FIG. 6).

In T384, the server 10 sends second FAX restriction screen data for causing the MFP 100 to display second FAX restriction screen including the causation message indicating the causation "Blocked" to the MFP 100 (S54B).

T386 is similar to T150 of FIG. 11 except that the second FAX restriction screen is displayed. In the present case, any of the buttons in the second FAX restriction screen is not selected by the user. Due to this, in T388, the MFP 100 automatically deletes the second FAX restriction screen after the predetermined time has elapsed (YES to S178, S180 of FIG. 8). Here, in the "Scan to Email" function, the email sending request is sent to the server 10 (T142 of FIG. 11)

with the user selection of the scan button in the scan screen displayed on the MFP 100 as a trigger (T36 of FIG. 9). Due to this, it is likely that the user sees the Scan restriction screen in the case of the Scan restriction screen being displayed on the MFP 100 (T150). Contrary to this, in the "FAX to Email" function, the "FAX to Email" request is sent to the server 10 (T384 of FIG. 12) with receipt of the FAX data FD2 as a trigger (T380 of FIG. 12). Due to this, in the case where the second FAX restriction screen is displayed on the MFP 100 (T392), it is unlikely that the user sees the second FAX restriction screen. As described above, by deleting the second FAX restriction screen automatically, it is possible to suppress the second FAX restriction screen from being continued to be displayed unnecessarily.

Subsequently, the MFP 100 accepts the program use operation from the user in T410 (YES to S100 of FIG. 7). T412 is similar to T22 of FIG. 9.

When the access request is received from the MFP 100 in T412 (YES to S2 of FIG. 3), in T414 the server 10 specifies the restriction flag "ON" stored in association with both the device ID "d01" and the FAX email address MA3 from the restriction table 34. Then, the server 10 determines the specified restriction flag as indicating "ON" (YES to S4).

In T416, the server 10 sends the first FAX restriction screen data to the MFP 100 (S6 of FIG. 3). Due to this, the MFP 100 displays the first FAX restriction screen (S105 of FIG. 7) in T420. The first FAX restriction screen is displayed with the program use operation being performed on the MFP 100 as a trigger. Due to this, it is likely that the user sees the first FAX restriction screen. According to the configuration of the present case, even if the user does not see the second FAX restriction screen, it is possible to notify the user that the sending of an email with the "FAX to Email address" as a destination has been restricted. Especially, the program use operation is the trigger for executing the process (such as S16 of S3) related to the "FAX to Email function", not only for executing the "Scan to Email" function. Thus, it is possible to notify the user that is using the "FAX to Email" function that the sending of an email with the "FAX to Email" address as a destination has been restricted.

Figure 13:
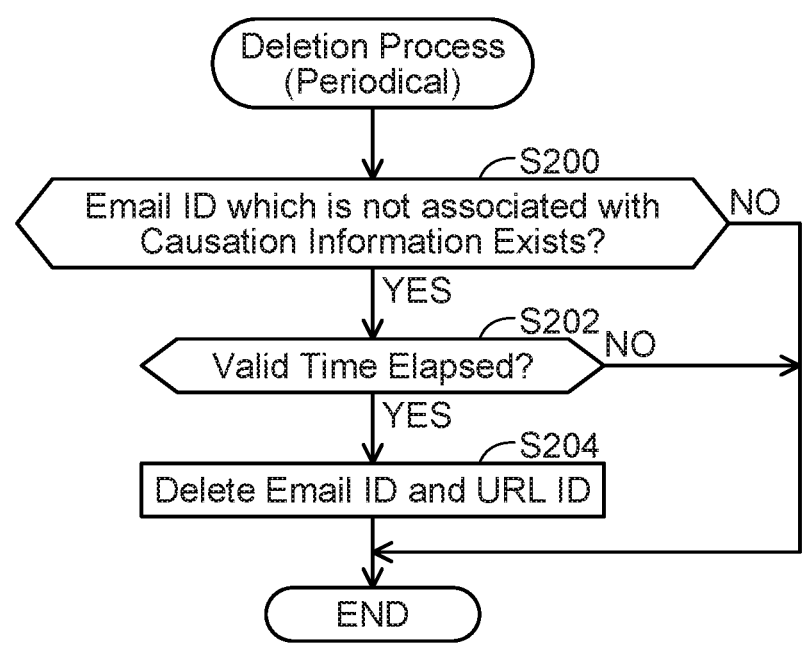
FIG. 13 shows a flowchart of a deletion process.

Deletion Process; FIG. 13

With reference to FIG. 13, a deletion process executed by the CPU 22 of the server 10 will be descried. The deletion process is periodically executed after the power of the server 10 is turned on.

In S200, the CPU 22 determines whether an email ID not related to any causation information (hereafter, "target email ID") exists in the sending table 32. In a case of determining that the target email ID exists (YES to S200), the CPU 22 proceeds to S202. On the other hand, in a case of determining that the target email ID does not exist in the sending table 32 (NO to S200), the CPU 22 skips processes from S202, and terminates the process of FIG. 13.

In S202, the CPU 22 determines whether a predetermined valid time (e.g. one day) has elapsed since a date and time indicated by a time stamp stored in association with the target email ID. In a case of determining that the valid time has elapsed since the date and time (YES to S202), the CPU 22 proceeds to S204. On the other hand, in a case of determining that the valid time has not elapsed since the date and time (NO to S202), the CPU 22 skips S204, and terminates the process of FIG. 13.

In S204, the CPU 22 deletes the target email ID and the URL ID stored in association with the target email ID from the sending table 32. Here, in a case where there is a plurality of target email IDs, the process of S202 and S204 is executed for each of the target email IDs. When S204 is completed, the process of FIG. 13 is terminated.

The existence of the target email ID means that the unsent notification was not received during a period from when the server email was sent to when the valid time has elapsed. That is, the target email ID indicates the email ID of the server email for which an alert such as an error has not occurred. According to the aforementioned configuration, the unnecessary email ID can be deleted.

Effect of Present Embodiment

According to the configuration of the present embodiment, in the case of receiving the email sending request from the MFP 100 (T42 of FIG. 9), the server 10 sends the email EM1 including the email ID "m01" and also stores the device ID "d01" and the email ID "m01" in association with each other in the sending table 32 (T52 of FIG. 10). Then in the case of receiving the blocked notification including the email ID "m01" (T74), the server 10 stores the device ID "d01" associated with the email ID "m01" and the restriction flag "ON" in the restriction table 34 (T78). Due to this, in the case of receiving the email sending request again from the MFP 100 (T142 of FIG. 11), the server 10 can restrict the sending of an email (T144). As a result of this, the server 10 can suppress unnecessary sending of an email in the "Scan to Email" function.

Further, in the case of receiving the "FAX to Email" request from the MFP 100 (T314 of FIG. 12), the server 10 sends the email EM3 including the email ID "m03" and also stores the device ID "d01" and the email ID "m03" in association with each other in the sending table 32 (T352 of FIG. 12). Then in the case of receiving the blocked notification including the email ID "m03" (T374), the server 10 stores the device ID "d01" associated with the email ID "m03" and the restriction flag "ON" in association with each other in the restriction table 34 (T378). Due to this, in the case of receiving the "FAX to Email" request again from the MFP 100 (T384), the server 10 can restrict the sending of an email (T386). As a result of this, the server 10 can restrict the unnecessary sending of an email in the "FAX to Email" function. Further, according to the configuration of the present embodiment, in the "FAX to Cloud" function also, the unnecessary sending of an email can be similarly suppressed.

Correspondence Relationship

The server 10, the memory 24, the MFP 100, the MFP 200, the terminal device 500, and the memory 124 are examples of a "server" "memory (and first memory)", "first device", "second device", "terminal device", and "second memory", respectively. The device ID "d01" and the device ID "d02" are examples of "first device identification information" and "second device identification information". The email ID or the URL ID is an example of "email identification information". One of the unsent notification, the blocked notification, and the restriction request is an example of "alert information". The restriction flag "ON" is an example of the "restriction information". The operation of selecting the Scan button in the menu screen and the operation of selecting an email address in the menu screen are examples of "scan executing operation" and "selection operation", respectively. The program use operation and the server program 128 are examples of a "predetermined operation" and a "predetermined program". The restriction URL and the deletion URL are examples of a "first URL" and a "second URL", respectively. The valid time is an example of a "predetermined time".

In the "Scan to Email" function, the "Scan to Email" address MA1 and the "Scan to Email" address MA2 are examples of a "first email address" and a "second email address", respectively. The scan data SD1, SD2, and SD3 are examples of "first image data", "second image data", and "third image data", respectively. The email sending request of T42 of FIG. 9, the email sending request of T142 FIG. 11, and the email sending request of T242 of FIG. 11 are examples of "first sending information", "second sending information", and "third sending information", respectively. The Scan restriction screen and the Scan restriction screen data are examples of a "notifying information" and "restriction notifying information", respectively. The selection of the Scan button in the menu screen is an example of a "specific instruction".

In the "FAX to Email" function, the "FAX to Email" address MA3 is an example of the "first email address". The FAX data FD1, FD2 are examples of the "first image data" and the "second image data", respectively. The "FAX to Email" request of T314 of FIG. 12 and the "FAX to Email" request of T384 are the "first sending information" and the "second sending information", respectively. The first and second FAX restriction screens, the first and second FAX restriction screen data are examples the "notifying screen" and the "restriction notifying information", respectively. The reception of the FAX data is an example of the "specific instruction".

In the "FAX to Cloud" function, the "FAX to Cloud" address MA3 is an example of the "first email address". The FAX data is an example of the "first image data and the second image data". The completion notification of T10 of FIG. 2 is an example of the "first sending information and the second sending information". The first and second FAX restriction screens and the first and second FAX restriction screen data are examples of the "notifying screen" and the "restriction notifying information", respectively. The reception of the FAX data is an example of the "specific instruction".

S32 of FIG. 4 is an example of a process realized by "send a first email and sending a second email". S32 and S38 are examples of processes realized by "store first device identification information and the email identification information in association with each other in the memory" and "store the first device identification information and restriction information in association with each other in the memory", respectively.

In the "Scan to Email" function, S14 of FIG. 3 is an example of a process realized by "receive first sending information" and "receive second sending information", respectively. S114 of FIG. 7 is an example of a process realized by the "receive the first sending information" and "receive the second sending information" respectively.

In the "FAX to Email" function, S60 of FIG. 6 is an example of the process realized by the "receive first sending information" and "receive second sending information", respectively. S154 of FIG. 8 is an example of the process realized by the "receive the first sending information" and "receive the second sending information", respectively.

In the "FAX to Cloud" function, S68 of FIG. 6 is an example of the process realized by the "receive first sending information" and "receive second sending information", respectively. S164 of FIG. 8 is an example of the process realized by the "receive the first sending information" and "receive the second sending information", respectively.

Second Embodiment

In the present embodiment, the email table 30 and the restriction table 34 are stored in the memory 124 of the MFP 100. The email table 30 and the restriction table 34 do not include device IDs. Further, processes using the email table 30 and the restriction table 34 are executed by the CPU 122 of the MFP 100.

Figure 14:
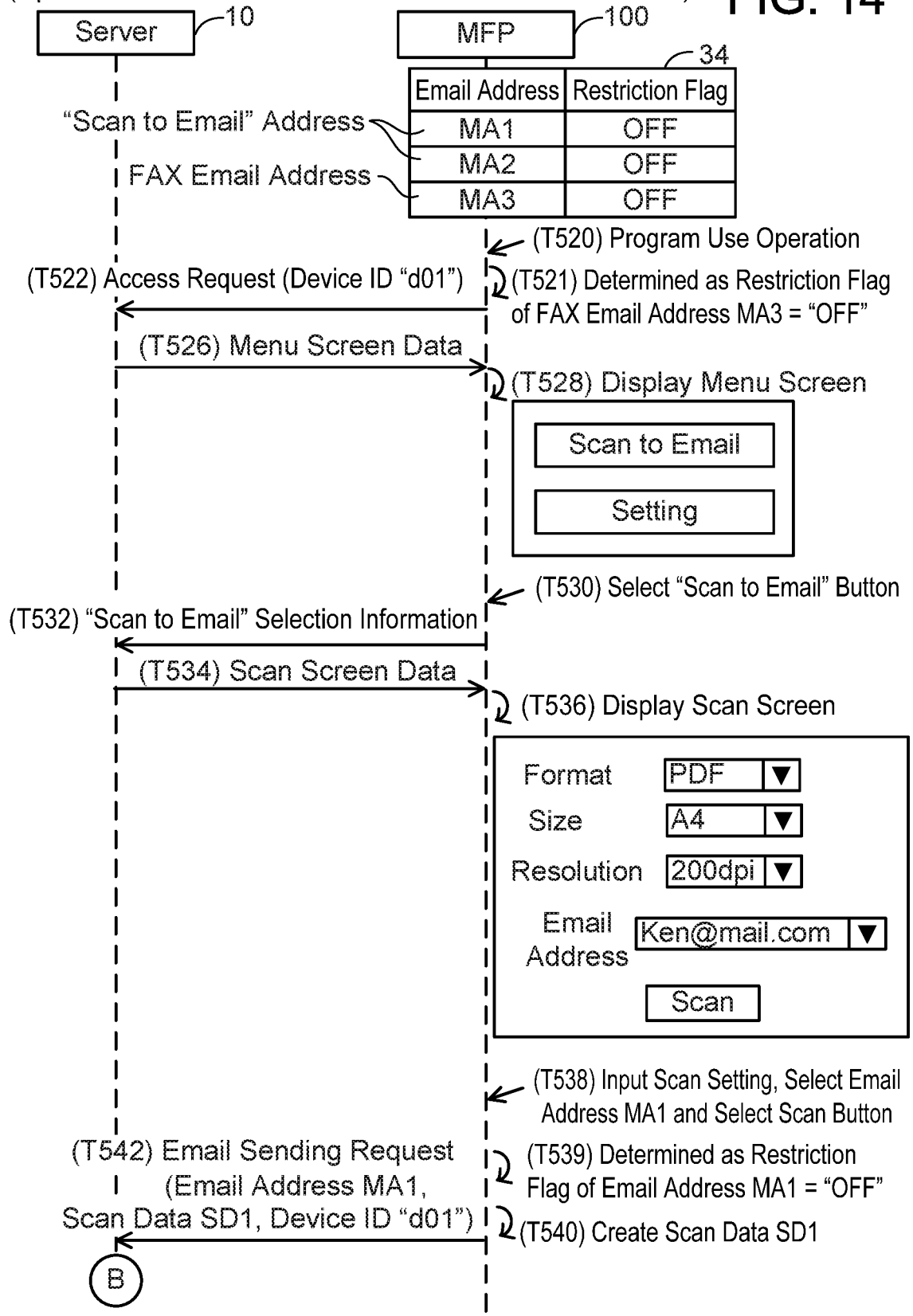
FIG. 14 shows a specific case of Scan to Email according to a second embodiment.
Figure 15:
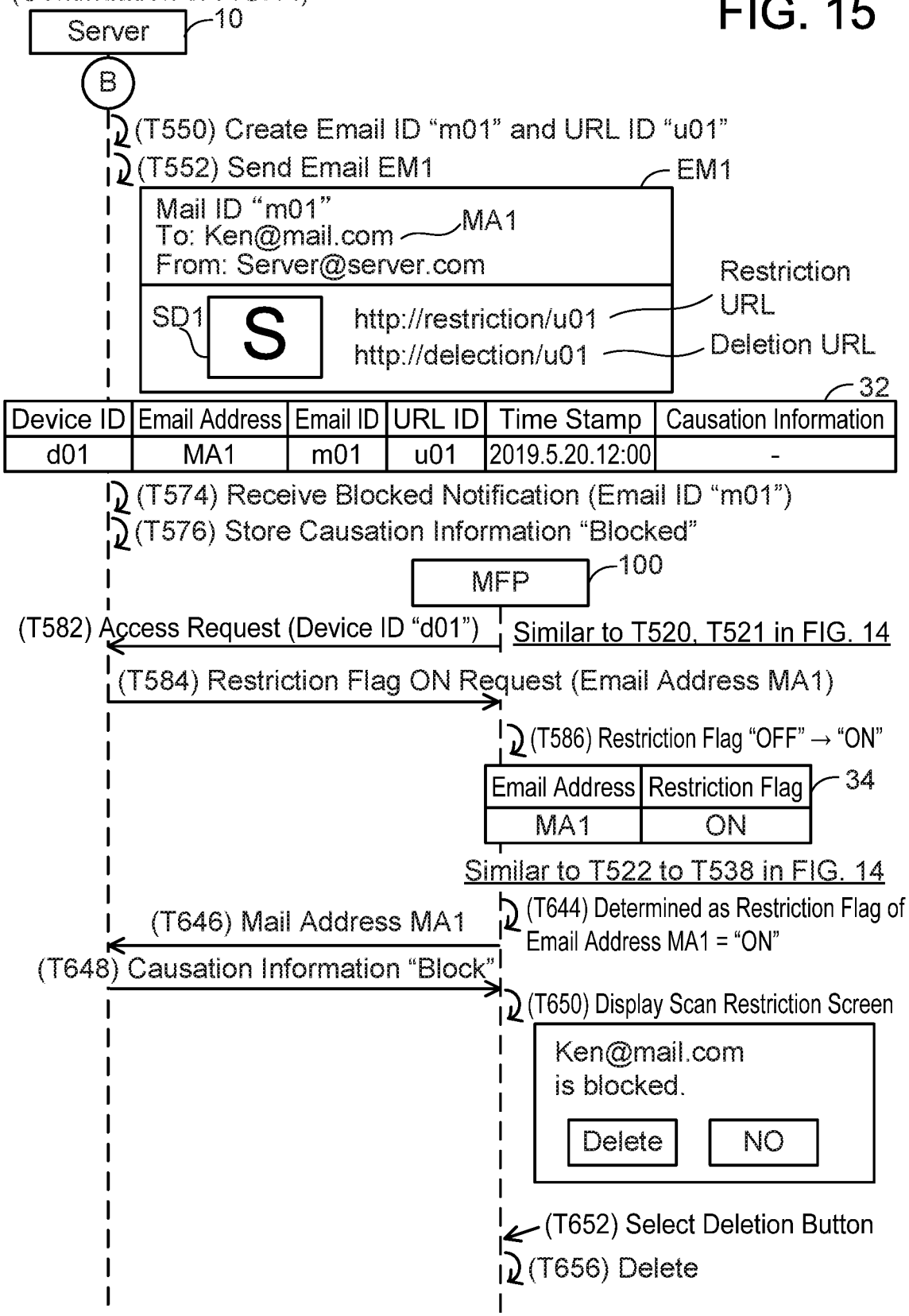
FIG. 15 shows a continuation of FIG. 14.

Specific Case in Scan to Email; FIGS. 14 and 15

With reference to FIGS. 14 and 15, a specific case in Scan to Email will be described. In an initial state of the present case, similar to the case of FIG. 9, three email addresses MA1, MA2, MA3 are stored in the email table 30, and the restriction flag "OFF" is stored in the restriction table 34 in association with each of the addresses MA1 to MA3.

T520 is similar to T20 of FIG. 9. In T521, the MFP 100 specifies the restriction flag stored in association with the FAX email address MA3 from the restriction table 34.

In the present case, the MFP 100 determines the specified restriction flag indicates "OFF", and sends an access request to the server 10 in T522. Then, the MFP 100 receives menu screen data from the server 10 in T526, and displays a menu screen in T528 (see S102, S106 of FIG. 7). If it is determined that the specified restriction flag indicates "ON", the MFP 100 displays a first FAX restriction screen on the displaying unit 116 (see S105 of FIG. 7) and sends an access request to the server 10.

T530 to T538 are similar to T30 to T38 of FIG. 9 except that the scan screen data of T534 do not include the email addresses MA1, MA2.

In T539, the MFP 100 specifies the restriction flag stored in association with the "Scan to Email" address MA1 selected in T538 from the restriction table 34 in the memory 124. In the present case, the MFP 100 determines the specified restriction flag as "OFF", and executes processes from T540. If the specified restriction flag is determined as "ON", that case will be described in processes after T644 of FIG. 15.

T540, T542, and T550, T552, T574, T576 of FIG. 15 are similar to T40, T42 of FIG. 9 and T50, T52, T74, T76 of FIG. 10. That is, in the present case, the causation of an alert is "Blocked". The server 10 stores the causation information "Blocked" in association with the email ID "m01" in the sending table 32 in T576.

Subsequently, the user uses the "Scan to Email" function again in order to send an email with the "Scan to Email" address MA1 as a destination. Due to this, processes similar to T520, T521 of FIG. 14 are executed. Then, the MFP 100 sends an access request to the server 10 in T582.

When the access request has been received from the MFP 100 in T582, the server 10 determines whether or not the causation information is stored in association with the device ID "d01" in the access request in the sending table 32 in T582. Since the causation information "Blocked" is stored in association with the device ID "d01" in the present case, the server 10 sends a restriction flag ON request for changing the restriction flag in the MFP 100 from "OFF" to "ON" to the MFP 100 in T584. The restriction flag ON request includes the email address MA1 stored in association with the device ID "d01" in the access request. Here, if any causation information is not stored in association with the device ID "d01" in the access request, the server 10 skips processes from T584, and sends menu screen data to the MFP 100 (see T526 of FIG. 14).

When the restriction flag ON request is received from the server 10 in T584, the MFP 100 changes the restriction flag stored in the restriction table 34 in association with the email address MA1 in the restriction flag ON request from "OFF" to "ON" in T586.

Subsequently, processes similar to T522 to T538 of FIG. 14 will be executed. That is, the MFP 100 sends the access request to the server 10 again.

In T644, the MFP 100 specifies the restriction flag stored in association with the "Scan to Email" address MA1 selected by the user from the restriction table 34 in the memory 124. In the present case, the MFP 100 determines the specified restriction flag as "ON". If the specified restriction flag is determined as "OFF", the process is similar to T539 of FIG. 14.

In T646, the MFP 100 sends the email address MA1 to the server 10, and inquires the server 10 of the causation information. Then, the MFP 100 receives the causation information "Blocked" stored in the sending table 32 in association with the email address MA1 from the server 10 in T648.

In T650, the MFP 100 displays a Scan restriction screen including a causation message indicating the causation "Blocked" on the displaying unit 116 (see S122 of FIG. 7).

In T652, the MFP 100 accepts a selection of the deletion button in the Scan restriction screen. In 656, the MFP 100 deletes the email address MA1 from the email table 30 in the memory 124.

Effects of Present Embodiment

According to the configuration of the present embodiment, the MFP 100 sends the email sending request including the email address MA1 in the case where the selection of the email address MA1 in the scan screen is accepted (T542 of FIG. 14). Due to this, the server 10 sends the email EM1 (T552 of FIG. 15). Then, in the case where the server 10 receives the blocked notification including the email ID "m01" identifying the email EM1 has been received (T574), the MFP 100 receives the restriction flag ON request from the server 10 and stores the email address MA1 and the restriction flag "ON" in association with each other in the restriction table 34 (T586). Due to this, in the case where the selection of the email address MA1 in the scan screen has been accepted, the MFP 100 can display the Scan restriction screen to restrict the sending of an email sending request to the server 10 (T650). As a result of this, the server 10 can restrict the unnecessary sending of an email in the "Scan to Email" function.

The case where the sending of an email is restricted if the causation of the alert is "Blocked" has been described in relation to FIGS. 14 and 15. In the present embodiment, even when the causation of the alert is any of "Temporary Disconnection", "Inexistent Address" and "Restriction URL", similar to the case of FIGS. 14 and 15, the sending of an email can be restricted.

Further, the case where the sending of an email is restricted in the "Scan to Email" function has been described in relation to FIGS. 14 and 15. In the present embodiment, even when any of the "FAX to Email" function and the "FAX to Cloud" function is used, similar to the case of FIGS. 14 and 15, the sending of an email can be restricted.

Correspondence Relationship

The MFP 100, the memory 124 are examples of a "communication device", a "second memory" and "third memory", respectively. T542, T584 of FIG. 14 are processes realized by "send a first email sending request" and "receive a storing request". The MFP 100 sending the email sending request to the server 10 if the specified restriction flag is determined as "OFF" in T644 of FIG. 15 is an example of a process realized by "send a second email sending request."

Variant 1

The "first device (and communication device)" are not limited to the MFP 100, but may be a scanner configured to execute only the scan function and a FAX device configured to execute only the FAX function.

Variant 2

In the first embodiment, the MFP 100 receives the FAX data via the PSTN I/F 118. Instead of this, the MFP 100 may receive the FAX data via the network I/F 112 from a terminal device configured to execute an Internet FAX function. In this case, the FAX data may be image data stored in the terminal device. In the present variant, the FAX data received via the network I/F 112 is an example of the "first image data".

Variant 3

URL ID(s) may not be stored in the sending table 32. In this case, the restriction URL and the deletion URL may include an email ID. In the present variant, the email ID is an example of the "email identification information."

Variant 4

The Scan restriction screen mays include a sending button for instructing to send an email. In a case where the sending button in the Scan restriction screen is selected, the server 10 may send an email irrespective to the restriction flag indicating "ON". In general terms, "the sending of the second email is restricted" includes sending the second email on a condition that the sending button in the Scan restriction screen is selected.

Variant 5

In the first embodiment, the restriction process is executed (S86 of FIG. 6) in the second server process (i.e. process such as the "FAX to Email" function). Instead of this, in the case of determining that the restriction flag indicates "ON" (NO to S82), the server 10 may terminate the process of FIG. 6 without executing the restriction process. That is, the server 10 may not send the second FAX restriction screen data to the MFP 100. In general terms, the "sending of the second email is restricted" includes not sending the second email and not sending the restriction notifying information (e.g. the second FAX restriction screen data).

Variant 6

In the first embodiment, the server 10 sends the Scan restriction screen data to the MFP 100 (S54A of FIG. 5). Instead of this, the server 10 may send text data indicating the causation message to the MFP 100. In the present variant, the text data is an example of the "restriction notifying information."

Variant 7

The "predetermined operation" is not limited to the program use operation, but may be an operation of selecting the setting button in the menu screen.

Variant 8

In the first embodiment, in the case of receiving the access request, the server 10 determines whether the restriction flag stored in association with the FAX email address indicates "ON" (S4 of FIG. 3). Instead of this, in the case of receiving the access request, the server 10 may determine whether the restriction flag stored in association with the "Scan to Email" address indicates "ON". Then, in a case of determining that the restriction flag stored in association with the "Scan to Email" address indicates "ON", the server 10 may send the Scan restriction screen data to the specific MFP. In general terms, the "first email address" may indicate a destination of an email regarding the sending of the scan data.

Variant 9

The processes of S6, S26 of FIG. 3 and S86 of FIG. 6 may not be executed. In the present variant, "send the restriction notifying information" may be omitted. Further, the processes of S26, S28 may be executed but the process of S6 may not be executed. In the present variant, the "access request" may be omitted.

Variant 10

The second FAX restriction screen may not be automatically deleted. In general terms, a notifying screen may be deleted from the displaying unit of the first device in response to a button in the notifying screen being operated. Further, the second FAX restriction screen may be same as the first FAX restriction screen. Moreover, the first FAX restriction screen may be same as the Scan restriction screen.

Variant 11

The sending table 32 may not store the causation information. In the present variant, the "causation information" may be omitted.

Variant 12

The process of S50 of FIG. 5 may not be executed. In the present variant, the "delete the restriction information associated with the first device identification information from the memory" may be omitted.

Variant 13

The server email may not include the restriction URL and the deletion URL. In the present variant, the "first URL" and the "second URL" may be omitted.

Variant 14

The deletion process of FIG. 13 may not be executed. In the present variant, "delete the email identification information from the memory" may be omitted.

Variant 15

In the respective embodiments, each process of FIGS. 2 to 15 is realized by software (e.g. program 26, 126, 128), however, at least one of these processes may be realized by hardware such as a logic circuit.

Variant 16

In the second embodiment, the email table 30 and the restriction table 34 are stored in the memory 124 of the MFP 100. Instead of this, the restriction table 34 may be stored in the memory 124 of the MFP 100, and the email table 30 may be stored in the memory 24 of the server 10. In this case, the email sending request of FIG. 14 may include information for the server 10 to specify the email address MA1, instead of the email address MA1 itself.

Variant 17

In the second embodiment, the restriction table 34 and the like are stored in the memory 124 of the MFP 100. Instead of this, the restriction table 34 and the like may be stored in a memory arranged separately from the MFP 100. In the present variant, the memory arranged separately from the MFP 100 is an example of the "third memory".

What is claimed is:

1. A server comprising:
   a processor;
   a memory storing a first email address in association with first device identification information identifying a first device and storing computer readable instructions therein,
   wherein the computer-readable instructions, when executed by the processor, cause the server to:
   receive first sending information from the first device, the first sending information being for sending a first email, and the first email being related to sending of first image data;
   in a case where the first sending information is received from the first device, send the first email with the first email address as destination stored in association with the first device identification information identifying the first device;
   in the case where the first sending information is received from the first device, store email identification information identifying the first email in the memory in association with the first device identification information identifying the first device;
   in a case where alert information including the email identification information is received after the first email has been sent, store restriction information in the memory in association with the first device identification information associated with the email identification information, the restriction information indicating restriction on sending of an email;
   receive second sending information from the first device, the second sending information being for sending a second email, and the second email being related to sending of second image data; and
   in a case where the second sending information is received from the first device in a state where the restriction information is not stored in association with the first device identification information, send the second email with the first email address as destination stored in association with the first device identification information identifying the first device, wherein in a case where the second sending information is received from the first device in a state where the restriction information is stored in association with the first device identification information, the sending of the second email is restricted.

2. The server as in claim 1, wherein
the memory further stores second device identification information in association with the first email address, the second device identification information identifying a second device different from the first device,
the computer-readable instructions, when executed by the processor, further cause the server to:
in the state where the restriction information is stored in association with the first device identification information, receive third sending information from the second device, the third sending in being for sending a third email, and the third email being related to sending of third image data; and
in a case where the third sending information is received from the second device in the state where the restriction information is stored in association with the first device identification information, send the third email with the first email address as destination stored in association with the second device identification information identifying the second device.

3. The server as in claim 1, wherein
the computer-readable instructions, when executed by the processor, further cause the server to:
in the state where the restriction information is stored in association with the first device identification information, send restriction notifying information to the first device, the restriction notifying information being for causing the first device to display a notifying screen indicating that sending of an email with the first email address as destination is restricted.

4. The server as in claim 3, wherein
the restriction notifying information is sent to the first device in the case where the second sending information is received from the first device in the state where the restriction information is stored in association with the first device identification information.

5. The server as in claim 4, wherein
the second sending information is any one of:
information which is sent from the first device due to a scan executing operation being performed on the first device, the scan executing operation being for generating the second image data which is scan data; and
information which is sent front the first device due to the second image data which is facsimile data being received by the first device.

6. The server as in claim 5, wherein
in a case where the second sending information is the information which is sent from the first device due to the scan executing operation being performed on the first device, the notifying screen is deleted from the first device in response to a button in the notifying screen being operated, and
in a case where the second sending information is the information which is sent from the first device due to the second image data which is the facsimile data being received by the first device, the notifying screen is deleted from the first device without the button in the notifying screen being operated.

7. The server as in claim 3, wherein
the restriction notifying information is sent to the first device in a case where an access request including the first device identification information is received from the first device in the state where the restriction information is stored in association with the first device identification information, and
the access request is sent from the first device in a case where a predetermined operation for accessing the server is performed on the first device.

8. The server as in claim 7, wherein
the first device stores a predetermined program,
the predetermined program is a program which causes the first device to execute a plurality of processes including:
a process of sending, to the server, the second sending information for sending the second email related to the sending of the second image data which is scan data; and
a process of sending, to the server, the second sending information for sending the second email related to the sending of the second image data which is facsimile data, and
the predetermined operation is an operation for using the predetermined program.

9. The server as in claim 8, wherein
the first email address indicates a destination of an email being related to the sending of the facsimile data,
in the case where the alert information is received, the restriction information is stored in the memory further in association with the first email address, and
in a case where the access request is received from the first device and the restriction information is stored in association with the first email address, the restriction notifying information is sent to the first device.

10. The server as in claim 4, wherein
the memory further stores a second email address in association with the first device identification information, the second email address being different from the first email address,
the second sending information is information which is sent from the first device due to a selection operation being performed on the first device, the selection operation being for selecting the first email address from among the first email address and the second email address, and
the second sending information includes the first device identification information and the first email address.

11. The server as in claim 3, wherein
the restriction information is stored in the memory in association with the first device identification information and causation information indicating a causation of an alert indicated by the alert information, and
the notifying screen further indicates the causation indicated by the causation information stored in association with the first device identification information.

12. The server as in claim 11, wherein
the second sending information includes the first device identification information,
the computer-readable instructions, when executed by the processor, further cause the server to:
delete the restriction information associated with the first device identification information from the memory in a case where the second sending information is received from the first device in the state where the restriction information is stored in association with the first device identification information and the causation information, and the causation information associated with the first device identification information indicates that the first email temporarily could not be sent to the destination.

13. The server as in claim 1, wherein
a body of the first email includes a first Uniform Resource Locator (URL) for accepting a sending instruction of the alert information,
the first URL includes the email identification information, and
the alert information is information which is received from a terminal device displaying the first email due to the first URL included in the body of the first email being selected.

14. The server as in claim 13, wherein
the body of the first email further includes a second URL for accepting a deleting instruction of the restriction information,
the second URL includes the email identification information, and
the computer-readable instructions, when executed by the processor, further cause the server to:
delete the restriction information associated with the email identification information from the memory in a case where a deleting request including the email identification information is received from the terminal, device due to the second URL included in the body of the first email being selected in the state where the restriction information is stored in association with the first device identification information.

15. The server as in claim 1, wherein
the computer-readable instructions, when executed by the processor, further cause the server to:
delete the email identification information from the memory in a case where a predetermined time has elapsed since when the first email was sent in the state where the restriction information is not stored in association with the first device identification information.

16. A communication system comprising:
a server and a first device, wherein
the sever comprises:
   a first processor
   a first memory storing a first email address in association with first device identification information identifying a first device and storing first computer-readable instructions therein,
   wherein the first computer-readable instructions, when executed by the first processor, cause the server to:
   receive first sending information from the first device, the first sending information being for sending a first email, and the first email being related to sending of first image data;
   in a case where the first sending information is received from the first device, send the first email with the first email address as destination, stored in association with the first device identification information identifying the first device;
   in a case where the first sending information is received from the first device, store email identification information identifying the first email in the first memory in association with the first device identification information identifying the first device;
   in a case where alert information including the email identification information is received after the first email has been sent, store restriction information in the first memory in association with the first device identification information associated with the email identification information, the restriction information indicating restriction on sending an email;
   receive second sending information from the first device, the second sending information being for sending a second email, and the second email being related to sending of second image data; and
   in a case where the second sending information is received from the first device in a state where the restriction information is not stored in association with the first device identification information, send the second email with the first email address as destination stored in association with the first device identification information identifying the first device, wherein in a case where the second sending information is received from the first device in a state where the restriction information is stored in association with the first device identification information, the sending of the second email is restricted,
wherein the first device comprises:
   a second processor; and
   a second memory storing second computer-readable instructions therein,
   wherein the second computer-readable instructions, when executed by the second processor, cause the first device to:
   in a case where a specific instruction related to the first image data is inputted in the first device, send the first sending information to the server; and
   in a case where the specific instruction related to the second image data is inputted in the first device, send the second sending information to the server.

17. A non-transitory computer-readable medium storing computer-readable instructions for a server, wherein
the server stores a first email address in association with first device identification information identifying a first device, and
the computer-readable instructions, when executed by a processor of the server, cause the server to:
receive first sending information from the first device, the first sending information being for sending a first email, and the first email being related to sending of first image data;
in a case where the first sending information is received from the first device, send the first email with the first email address as destination stored in association with the first device identification information identifying the first device;
in the case where the first sending information is received from the first device, store email identification information identifying the first email in the memory in association with the first device identification information identifying the first device;
in a case where alert information including the email identification information is received after the first email has been sent, store restriction information in the memory in association with the first device identification information associated with the email identification information, the restriction information indicating restriction on sending of an email;
receive second sending information from the first device, the second sending information being for sending a second email, and the second email being related to sending of second image data; and
in a case where the second sending information is received from the first device in a state where the restriction information is not stored in association with the first device identification information, send the second email with the first email address as destination stored in association with the first device identification information identifying the first device, wherein in a case where the second sending information is received from the first device in a state where the restriction information is stored in association with the first device identification information, the sending of the second email is restricted.

18. A communication device comprising:
a processor;
a second memory storing computer-readable instructions therein,
wherein the computer-readable instructions, when executed by the processor, cause the communication device to:
in a case where a first instruction for sending a first email is accepted in the communication device, send a first email sending request to a server, the first email sending request being for requesting a sending of the first email which is related to sending of first image data;
in a case where the server receives alert information including email identification information identifying the first email after the server has sent the first email in accordance with the first email sending request, receive a storing request from the server, the storing request being for requesting to store restriction information in a third memory in association with an email address indicating a destination of the first email, the restriction information indicating restriction on sending of an email: and
in a case where a second instruction for sending a second email with the email address in the third memory as destination is accepted in the communication device in a state where the restriction information is not stored in the third memory, send a second email sending request to the server, the second email sending request being for requesting a sending of the second email which is related to sending of second image data, wherein in a case where the second instruction is accepted in the communication device in a state where the restriction information is stored in the third memory in association with the email address, the sending of the second email sending request to the server is restricted.

* * * * *

UNITED STATES PATENT AND TRADEMARK OFFICE
CERTIFICATE OF CORRECTION

PATENT NO. : 11,172,078 B2
APPLICATION NO. : 16/911619
DATED : November 9, 2021
INVENTOR(S) : Ken Saito It is certified that error appears in the above-identified patent and that said Letters Patent is hereby corrected as shown below:

In the Claims

Column 27, Claim 2, Line 14 should read:
device, the third sending information being for sending a third Signed and Sealed this
Twenty-seventh Day of June, 2023

Katherine Kelly Vidal
*Director of the United States Patent and Trademark Office*